United States Patent
Hagersten et al.

[19]
[11] Patent Number: 5,950,226
[45] Date of Patent: *Sep. 7, 1999

[54] MULTIPROCESSING SYSTEM EMPLOYING A THREE-HOP COMMUNICATION PROTOCOL

[75] Inventors: Erik E. Hagersten; Paul N. Loewenstein, both of Palo Alto, Calif.

[73] Assignee: Sun Microsystems, Inc., Palo Alto, Calif.

[*] Notice: This patent is subject to a terminal disclaimer.

[21] Appl. No.: 08/674,270

[22] Filed: Jul. 1, 1996

[51] Int. Cl.$^6$ ........................................ G06F 13/00
[52] U.S. Cl. ..................... 711/124; 711/141; 711/150; 711/152
[58] Field of Search ................... 711/124, 141, 711/150, 152

[56] References Cited

U.S. PATENT DOCUMENTS 5,265,232  11/1993  Gannon et al. ........................ 711/124
5,664,151   9/1997  Galles et al. ......................... 711/145
5,778,437   7/1998  Baylor et al. ........................ 711/141
5,822,763  10/1998  Baylor et al. ........................ 711/141

FOREIGN PATENT DOCUMENTS 0 539 012  4/1993  European Pat. Off. .

*Primary Examiner*—Frank J. Asta
*Assistant Examiner*—Daniel Patru
*Attorney, Agent, or Firm*—Conley, Rose & Tayon, PC; B. Noel Kivlin

[57] ABSTRACT

A multiprocessing computer system employing a three-hop communications protocol. When a request is sent by a requesting node to a home node, the home node sends read and/or invalidate demands to any slave nodes holding cached copies of the requested data. The demands from the home node to the slave nodes may each advantageously include a value indicative of the number of replies the requesting agent should expect to receive. The slaves reply back to the requesting node with either data or an acknowledge. Each reply may further include the number of replies the requester should expect. Upon receiving all expected replies, the requesting node may send a completion message back to the home and may treat the transaction as completed and proceed with subsequent processing.

24 Claims, 16 Drawing Sheets

| Request Code | Request Type | Origin |
|---|---|---|
| RTS | Read to Share (COMA) | R |
| RTO | Read to Own (COMA) | R |
| RS | Read Stream (COMA) | R |
| RTSN | Read to Share (NUMA) | R |
| RTON | Read to Own (NUMA) | R |
| RSN | Read Stream (NUMA) | R |
| WB | Write Back | R |
| INV | Invalidate | R |
| WS | Write Stream | R |
| RIO | I/O Read | R |
| RBIO | I/O Block Read | R |
| WIO | I/O Write | R |
| WBIO | I/O Block Write | R |
| FLU | Flush | R |
| INT | Interrupt | R |
| ADM | Administrative | R |

FIG. 9

| Demand Code | Demand Type | Origin |
|---|---|---|
| RTS | Read to Share | H |
| RTO | Read to Own | H |
| RS | Read Stream | H |
| INV | Invalidate | H |
| ADM | Administrative | H |

| Trans | Mtag | Req. | D | D' | D-O | D-S | R-H | R-OS | R-SS | Comp |
|---|---|---|---|---|---|---|---|---|---|---|
| RTS | i | RTS | m,o,s | - | - | - | ACK | - | - | CMP |
| RTS | i | RTS | i | s | RTS | - | - | D | - | CMP |
| RTS | n | RTSN | m,o | - | RTS | - | - | D | - | CMP |
| RTS | n | RTSN | s,i | s | RTS | - | - | D | - | CMP |
| RTO | o,s,i | RTO | m | - | - | - | ACK | - | - | CMP |
| RTO | o,s,i | RTO | o,s | m | INV | INV | - | ACK | ACK | CMP |
| RTO | o,s,i | RTO | i | m | RTO | INV | - | D | ACK | CMP |
| RTO | n | RTON | any | m | RTO | INV | - | D | ACK | CMP |
| RS | i | RS | m,o,s | - | - | - | ACK | - | - | CMP |
| RS | i | RS | i | - | RS | - | - | D | - | CMP |
| RS | n | RSN | any | - | RS | - | - | D | - | CMP |
| WS | o,s,i | INV | any | m | INV | INV | - | ACK | ACK | CMP |
| WS | n | WS | any | i | INV | INV | - | ACK | ACK | CMP_W |
| WB | n | WB | m,o | s | - | - | ACK | - | - | CMP_W |
| WB | n | WB | s,i | - | - | - | NACK | - | - | CMP |
| INT | - | INT | - | - | - | - | ACK | - | - | CMP_D |
| INT | - | INT | - | - | - | - | NACK | - | - | CMP |
| RIO | - | RIO | - | - | - | - | ANM | - | - | CMP |
| RIO | - | RIO | - | - | - | - | D | - | - | CMP |
| RBIO | - | RBIO | - | - | - | - | ANM | - | - | CMP |
| RBIO | - | RBIO | - | - | - | - | D | - | - | CMP |
| WIO | - | WIO | - | - | - | - | ACK | - | - | CMP_D |
| WBIO | - | WBIO | - | - | - | - | ACK | - | - | CMP_D |
| ADM | - | ADM | - | - | - | ADM | - | - | ACK | CMP |

FIG. 13

MULTIPROCESSING SYSTEM EMPLOYING A THREE-HOP COMMUNICATION PROTOCOL

BACKGROUND OF THE INVENTION

1. Field of the Invention

This invention relates to the field of multiprocessor computer systems and, more particularly, to communication protocols employed within multiprocessor computer systems having distributed shared memory architectures.

2. Description of the Relevant Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

Another structure for multiprocessing computer systems is a distributed shared memory architecture. A distributed shared memory architecture includes multiple nodes within which processors and memory reside. The multiple nodes communicate via a network coupled there between. When considered as a whole, the memory included within the multiple nodes forms the shared memory for the computer system. Typically, directories are used to identify which nodes have cached copies of data corresponding to a particular address. Coherency activities may be generated via examination of the directories.

Distributed shared memory systems are scaleable, overcoming the limitations of the shared bus architecture. Since many of the processor accesses are completed within a node, nodes typically have much lower bandwidth requirements upon the network than a shared bus architecture must provide upon its shared bus. The nodes may operate at high clock frequency and bandwidth, accessing the network when needed. Additional nodes may be added to the network without affecting the local bandwidth of the nodes. Instead, only the network bandwidth is affected.

The coherence between nodes in a distributed shared memory system is often kept using a distributed implementation of coherence protocols. Many such coherence protocols employ four-hop replies wherein a request is first sent to a home node from a requesting node. The home node responsively sends read/invalidate demands to slave nodes holding cached copies of the data. The slaves reply back to the home node according to the demands. The four-hop reply protocol is completed when the home node replies back to the requesting node.

Unfortunately, the communication patterns generated when data must be accessed from a remote node causes a significant amount of network traffic. In addition, after all slave nodes have replied to the home node, the requesting node must wait until the home node sends a completion indication back to the requesting node before the requesting node can treat the transaction as completed. This may add to the overall latency of the critical path associated with the coherency transaction.

A multiprocessor computer system having a distributed shared memory system is thus desirable wherein network traffic is reduced and wherein the latency in replying to a requesting node is reduced.

SUMMARY OF THE INVENTION

The problems outlined above are in large part solved by a multiprocessor computer system employing a communications protocol in accordance with the present invention. In one embodiment, when a request is sent by a requesting node to a home node, the home node sends read and/or invalidate demands to any slave nodes holding cached copies of the requested data. The demands from the home node to the slave nodes may each advantageously include a value indicative of the number of replies the requesting agent should expect to receive. The slaves reply back to the requesting node with either data or an acknowledge. Each reply may further include the number of replies the requester should expect. Upon receiving all expected replies, the requesting node may treat the transaction as completed and proceed with subsequent processing. In this manner, all communications may require at most a three-hop communication on the critical path of the cache coherence protocol. Accordingly, the overall network traffic as a result of the cache coherence protocol may be advantageously reduced. Furthermore, the latency of the critical path for a requesting node to complete a transaction may be reduced.

In one implementation, after the requesting node has received all expected replies, the requesting node may send a completion message back to the home. The home node may then remove a "block" placed upon the coherency unit of the completed transaction.

The requesting node may further or alternatively send data back to the home node to achieve memory reflection after receiving data from a slave node. Furthermore, in cases where the home node contains the requested data in an appropriate state, e.g., state shared for a read-to-own request, the home node does not send any demands to other nodes. Instead, the home node replies directly to the requesting node.

A system and method in accordance with the present invention may advantageously allow for an efficient and simple implementation of a global coherency protocol in a multiprocessing computer system. The protocol allows for an owner-based protocol wherein several dirty cached copies may reside in differing nodes with one of them in the owner state and a copy in the home node which is stale.

Broadly speaking, the present invention contemplates a multiprocessing computer system including a plurality of processing nodes interconnected by a network. The multiprocessing computer system comprises a request agent configured to generate a coherency request, a home agent coupled to receive the coherency request through the network and to generate a coherency demand in response to the coherency request, and a slave agent coupled to receive the coherency demand through the network and to generate a coherency reply in response to the coherency demand. The request agent is further configured to receive the coherency reply through the network.

The invention further contemplates a method for maintaining coherency in a multiprocessing computer system including a plurality of processing nodes interconnected by a network. The method comprises a request agent generating a coherency request, a home agent receiving the coherency request through the network, and the home agent generating a coherency demand in response to the coherency request. The method further comprises a slave agent receiving the coherency demand through the network, the slave agent generating a coherency reply in response to the coherency demand, and the request agent receiving the coherency reply through the network.

BRIEF DESCRIPTION OF THE DRAWINGS

Other objects and advantages of the invention will become apparent upon reading the following detailed description and upon reference to the accompanying drawings in which:

FIG. 9 is a table listing request types according to one embodiment of the system interface.

FIG. 10 is a table listing demand types according to one embodiment of the system interface.

FIG. 13 is a table describing coherency operations in response to various operations performed by a processor, according to one embodiment of the system interface.

Figure 1:
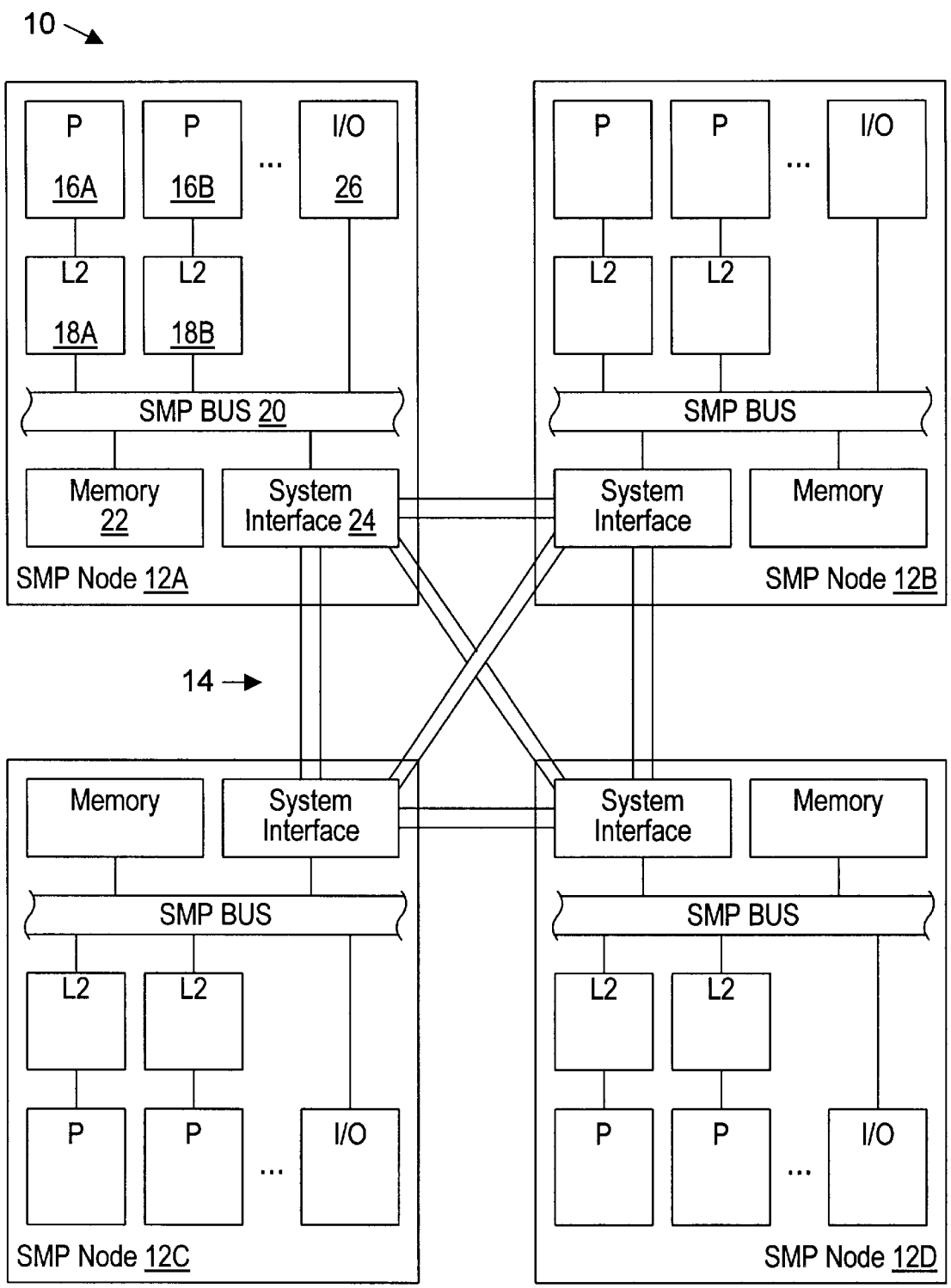
FIG. 1 is a block diagram of a multiprocessor computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a multiprocessing computer system 10 is shown.

Computer system 10 includes multiple SMP nodes 12A–12D interconnected by a point-to-point network 14. Elements referred to herein with a particular reference number followed by a letter will be collectively referred to by the reference number alone. For example, SMP nodes 12A–12D will be collectively referred to as SMP nodes 12. In the embodiment shown, each SMP node 12 includes multiple processors, external caches, an SMP bus, a memory, and a system interface. For example, SMP node 12A is configured with multiple processors including processors 16A–16B. The processors 16 are connected to external caches 18, which are further coupled to an SMP bus 20. Additionally, a memory 22 and a system interface 24 are coupled to SMP bus 20. Still further, one or more input/output (I/O) interfaces 26 may be coupled to SMP bus 20. I/O interfaces 26 are used to interface to peripheral devices such as serial and parallel ports, disk drives, modems, printers, etc. Other SMP nodes 12B–12D may be configured similarly.

Generally speaking, for any given transaction a particular SMP node 12 may serve as a requesting node, a home node, or a slave node. When a request is sent by a requesting node to a home node, the home node sends read and/or invalidate requests to any slave nodes holding cached copies of the requested data. The demands from the home node to the slave nodes advantageously includes a value indicative of the number of replies the requesting agent should expect to receive. The slaves reply back to the requesting node with either data or an acknowledge. Each reply may further include the number of replies the requester should expect. Upon receiving all expected replies, the requesting node may treat the transaction as completed and proceed with subsequent processing. In this manner, all communications may require at most a three-hop communication on the critical path of the cache coherence protocol. Accordingly, the overall network traffic as a result of the cache coherence protocol may be advantageously reduced. Furthermore, the latency of the critical path for a requesting node to complete a transaction may be reduced.

In one implementation, after the requesting node has received all expected replies, the requesting node may send a completion message back to the home. The home node may remove a "block" placed upon the coherency unit of the completed transaction.

The requesting node may further or alternatively send data back to the home node to achieve memory reflection after receiving data from a slave node. Furthermore, in cases where the home node contains the requested data in an appropriate state, e.g., state shared for a read-to-own request, the home node does not send any demands to other nodes. Instead, the home node replies directly to the requesting node. Further details regarding the communication protocol associated with system 10 are provided further below.

As used herein, a memory operation is an operation causing transfer of data from a source to a destination. The source and/or destination may be storage locations within the initiator, or may be storage locations within memory. When a source or destination is a storage location within memory, the source or destination is specified via an address conveyed with the memory operation. Memory operations may be read or write operations. A read operation causes transfer of data from a source outside of the initiator to a destination within the initiator. Conversely, a write operation causes transfer of data from a source within the initiator to a destination outside of the initiator. In the computer system shown in FIG. 1, a memory operation may include one or more transactions upon SMP bus 20 as well as one or more coherency operations upon network 14.

Each SMP node 12 is essentially an SMP system having memory 22 as the shared memory. Processors 16 are high performance processors. In one embodiment, each processor 16 is a SPARC processor compliant with version 9 of the SPARC processor architecture. It is noted, however, that any processor architecture may be employed by processors 16.

Typically, processors 16 include internal instruction and data caches. Therefore, external caches 18 are labeled as L2 caches (for level 2, wherein the internal caches are level 1 caches). If processors 16 are not configured with internal caches, then external caches 18 are level 1 caches. It is noted that the "level" nomenclature is used to identify proximity of a particular cache to the processing core within processor 16. Level 1 is nearest the processing core, level 2 is next nearest, etc. External caches 18 provide rapid access to memory addresses frequently accessed by the processor 16 coupled thereto. It is noted that external caches 18 may be configured in any of a variety of specific cache arrangements. For example, set-associative or direct-mapped configurations may be employed by external caches 18.

SMP bus 20 accommodates communication between processors 16 (through caches 18), memory 22, system interface 24, and I/O interface 26. In one embodiment, SMP bus 20 includes an address bus and related control signals, as well as a data bus and related control signals. Because the address and data buses are separate, a split-transaction bus protocol may be employed upon SMP bus 20. Generally speaking, a split-transaction bus protocol is a protocol in which a transaction occurring upon the address bus may differ from a concurrent transaction occurring upon the data bus. Transactions involving address and data include an address phase in which the address and related control information is conveyed upon the address bus, and a data phase in which the data is conveyed upon the data bus. Additional address phases and/or data phases for other transactions may be initiated prior to the data phase corresponding to a particular address phase. An address phase and the corresponding data phase may be correlated in a number of ways. For example, data transactions may occur in the same order that the address transactions occur. Alternatively, address and data phases of a transaction may be identified via a unique tag.

Memory 22 is configured to store data and instruction code for use by processors 16. Memory 22 preferably comprises dynamic random access memory (DRAM), although any type of memory may be used. Memory 22, in conjunction with similar illustrated memories in the other SMP nodes 12, forms a distributed shared memory system. Each address in the address space of the distributed shared memory is assigned to a particular node, referred to as the home node of the address. A processor within a different node than the home node may access the data at an address of the home node, potentially caching the data. Therefore, coherency is maintained between SMP nodes 12 as well as among processors 16 and caches 18 within a particular SMP node 12A–12D. System interface 24 provides internode coherency, while snooping upon SMP bus 20 provides intranode coherency.

In addition to maintaining internode coherency, system interface 24 detects addresses upon SMP bus 20 which require a data transfer to or from another SMP node 12. System interface 24 performs the transfer, and provides the corresponding data for the transaction upon SMP bus 20. In the embodiment shown, system interface 24 is coupled to a point-to-point network 14. However, it is noted that in alternative embodiments other networks may be used. In a point-to-point network, individual connections exist between each node upon the network. A particular node communicates directly with a second node via a dedicated link. To communicate with a third node, the particular node utilizes a different link than the one used to communicate with the second node.

It is noted that, although four SMP nodes 12 are shown in FIG. 1, embodiments of computer system 10 employing any number of nodes are contemplated.

Figure 1A:
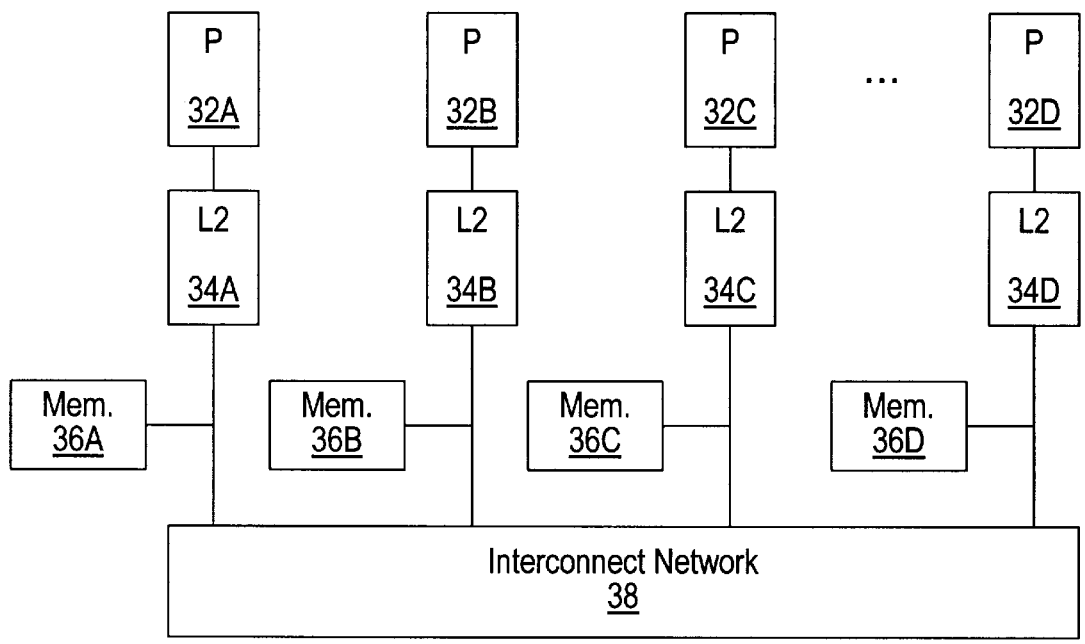
FIG. 1A is a conceptualized block diagram depicting a non-uniform memory architecture supported by one embodiment of the computer system shown in FIG. 1.
Figure 1B:
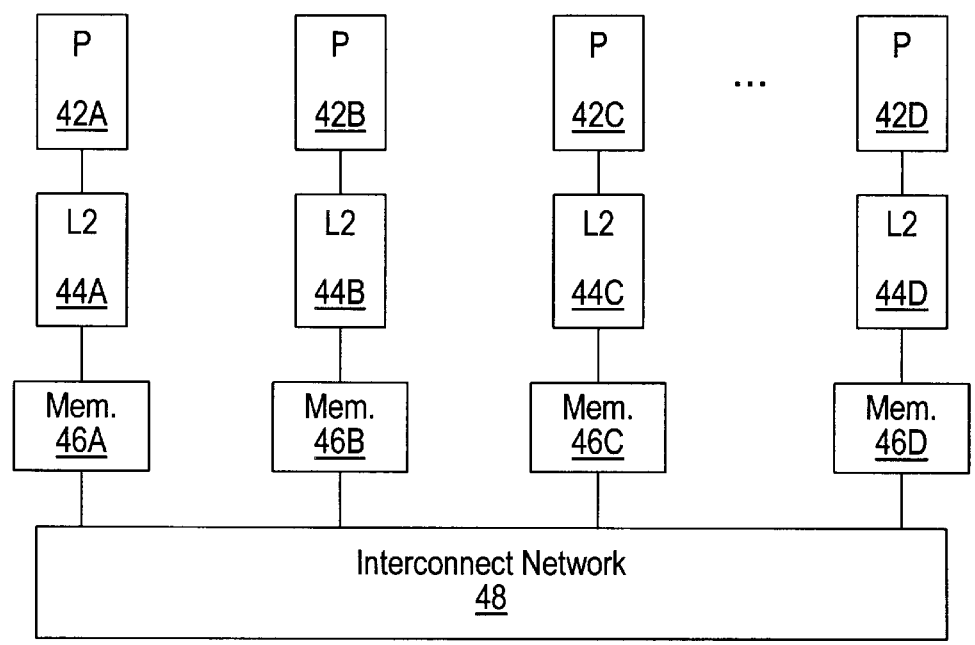
FIG. 1B is a conceptualized block diagram depicting a cache-only memory architecture supported by one embodiment of the computer system shown in FIG. 1.

FIGS. 1A and 1B are conceptualized illustrations of distributed memory architectures supported by one embodiment of computer system 10. Specifically, FIGS. 1A and 1B illustrate alternative ways in which each SMP node 12 of FIG. 1 may cache data and perform memory accesses. Details regarding the manner in which computer system 10 supports such accesses will be described in further detail below.

Turning now to FIG. 1A, a logical diagram depicting a first memory architecture 30 supported by one embodiment of computer system 10 is shown. Architecture 30 includes multiple processors 32A–32D, multiple caches 34A–34D, multiple memories 36A–36D, and an interconnect network 38. The multiple memories 36 form a distributed shared memory. Each address within the address space corresponds to a location within one of memories 36.

Architecture 30 is a non-uniform memory architecture (NUMA). In a NUMA architecture, the amount of time required to access a first memory address may be substantially different than the amount of time required to access a second memory address. The access time depends upon the origin of the access and the location of the memory 36A–36D which stores the accessed data. For example, if processor 32A accesses a first memory address stored in memory 36A, the access time may be significantly shorter than the access time for an access to a second memory address stored in one of memories 36B–36D. That is, an access by processor 32A to memory 36A may be completed locally (e.g. without transfers upon network 38), while a processor 32A access to memory 36B is performed via network 38. Typically, an access through network 38 is slower than an access completed within a local memory. For example, a local access might be completed in a few hundred nanoseconds while an access via the network might occupy a few microseconds.

Data corresponding to addresses stored in remote nodes may be cached in any of the caches 34. However, once a cache 34 discards the data corresponding to such a remote address, a subsequent access to the remote address is completed via a transfer upon network 38.

NUMA architectures may provide excellent performance characteristics for software applications which use addresses that correspond primarily to a particular local memory. Software applications which exhibit more random access patterns and which do not confine their memory accesses to addresses within a particular local memory, on the other hand, may experience a large amount of network traffic as a particular processor 32 performs repeated accesses to remote nodes.

Turning now to FIG. 1B, a logic diagram depicting a second memory architecture 40 supported by the computer system 10 of FIG. 1 is shown. Architecture 40 includes multiple processors 42A–42D, multiple caches 44A–44D, multiple memories 46A–46D, and network 48. However, memories 46 are logically coupled between caches 44 and network 48. Memories 46 serve as larger caches (e.g. a level 3 cache), storing addresses which are accessed by the corresponding processors 42. Memories 46 are said to "attract" the data being operated upon by a corresponding processor 42. As opposed to the NUMA architecture shown in FIG. 1A, architecture 40 reduces the number of accesses upon the network 48 by storing remote data in the local memory when the local processor accesses that data.

Architecture 40 is referred to as a cache-only memory architecture (COMA). Multiple locations within the distributed shared memory formed by the combination of memories 46 may store data corresponding to a particular address. No permanent mapping of a particular address to a particular storage location is assigned. Instead, the location storing data corresponding to the particular address changes dynamically based upon the processors 42 which access that particular address. Conversely, in the NUMA architecture a particular storage location within memories 46 is assigned to a particular address. Architecture 40 adjusts to the memory access patterns performed by applications executing thereon, and coherency is maintained between the memories 46.

In a preferred embodiment, computer system 10 supports both of the memory architectures shown in FIGS. 1A and 1B. In particular, a memory address may be accessed in a NUMA fashion from one SMP node 12A–12D while being accessed in a COMA manner from another SMP node 12A–12D. In one embodiment, a NUMA access is detected if certain bits of the address upon SMP bus 20 identify another SMP node 12 as the home node of the address presented. Otherwise, a COMA access is presumed. Additional details will be provided below.

In one embodiment, the COMA architecture is implemented using a combination of hardware and software techniques. Hardware maintains coherency between the locally cached copies of pages, and software (e.g. the operating system employed in computer system 10) is responsible for allocating and allocating cached pages.

Figure 2:
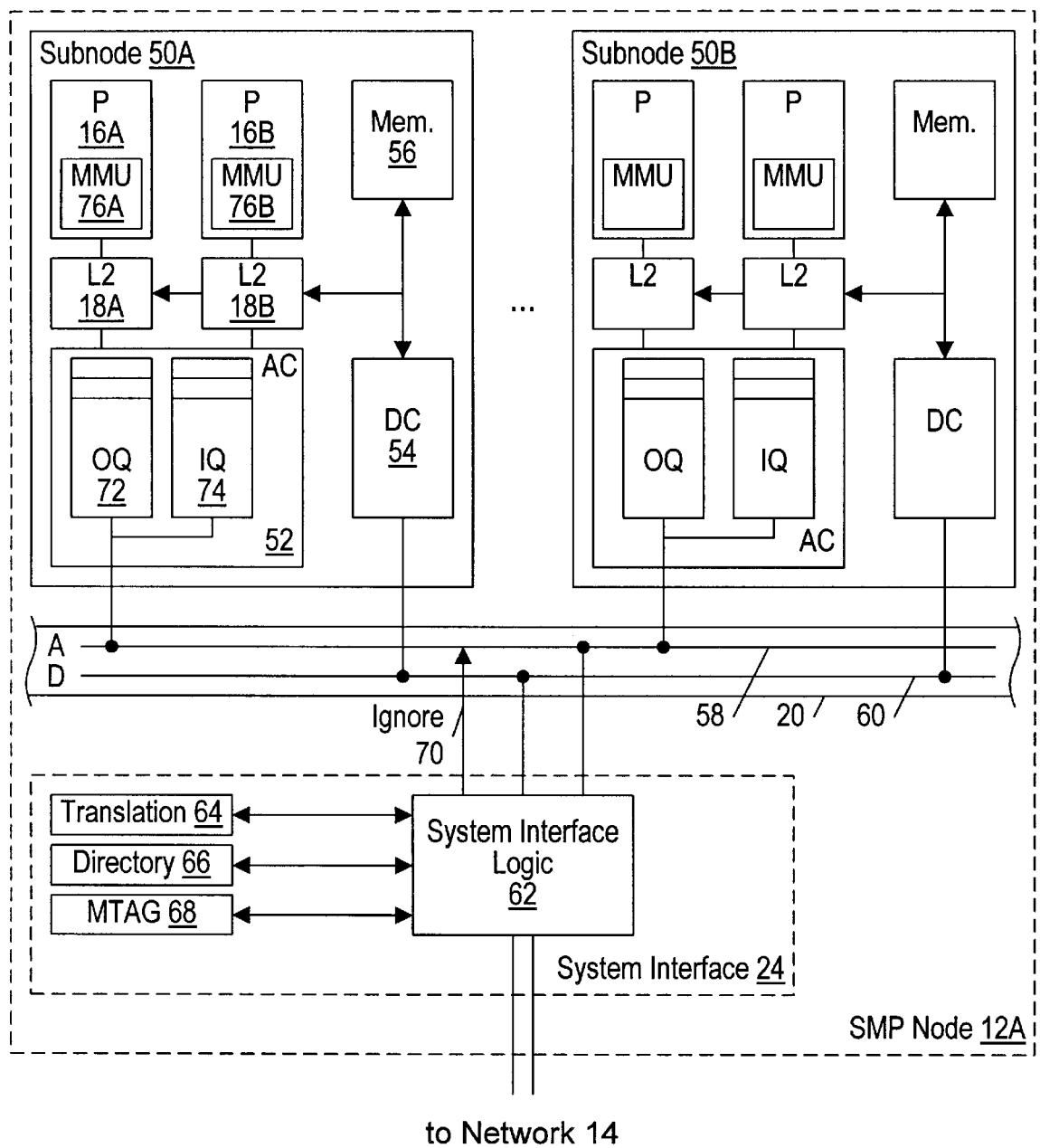
FIG. 2 is a block diagram of one embodiment of a symmetric multiprocessing node depicted in FIG. 1.

FIG. 2 depicts details of one implementation of an SMP node 12A that generally conforms to the SMP node 12A shown in FIG. 1. Other nodes 12 may be configured similarly. It is noted that alternative specific implementations of each SMP node 12 of FIG. 1 are also possible. The implementation of SMP node 12A shown in FIG. 2 includes multiple subnodes such as subnodes 50A and 50B. Each subnode 50 includes two processors 16 and corresponding caches 18, a memory portion 56, an address controller 52, and a data controller 54. The memory portions 56 within subnodes 50 collectively form the memory 22 of the SMP node 12A of FIG. 1. Other subnodes (not shown) are further coupled to SMP bus 20 to form the I/O interfaces 26.

As shown in FIG. 2, SMP bus 20 includes an address bus 58 and a data bus 60. Address controller 52 is coupled to address bus 58, and data controller 54 is coupled to data bus 60. FIG. 2 also illustrates system interface 24, including a system interface logic block 62, a translation storage 64, a directory 66, and a memory tag (MTAG) 68. Logic block 62 is coupled to both address bus 58 and data bus 60, and asserts an ignore signal 70 upon address bus 58 under certain circumstances as will be explained further below. Additionally, logic block 62 is coupled to translation storage 64, directory 66, MTAG 68, and network 14.

For the embodiment of FIG. 2, each subnode 50 is configured upon a printed circuit board which may be inserted into a backplane upon which SMP bus 20 is situated. In this manner, the number of processors and/or I/O interfaces 26 included within an SMP node 12 may be varied by inserting or removing subnodes 50. For example, computer system 10 may initially be configured with a small number of subnodes 50. Additional subnodes 50 may be added from time to time as the computing power required by the users of computer system 10 grows.

Address controller 52 provides an interface between caches 18 and the address portion of SMP bus 20. In the embodiment shown, address controller 52 includes an out queue 72 and some number of in queues 74. Out queue 72 buffers transactions from the processors connected thereto until address controller 52 is granted access to address bus 58. Address controller 52 performs the transactions stored in out queue 72 in the order those transactions were placed into out queue 72 (i.e. out queue 72 is a FIFO queue). Transactions performed by address controller 52 as well as transactions received from address bus 58 which are to be snooped by caches 18 and caches internal to processors 16 are placed into in queue 74.

Similar to out queue 72, in queue 74 is a FIFO queue. All address transactions are stored in the in queue 74 of each subnode 50 (even within the in queue 74 of the subnode 50 which initiates the address transaction). Address transactions are thus presented to caches 18 and processors 16 for snooping in the order they occur upon address bus 58. The order that transactions occur upon address bus 58 is the order for SMP node 12A. However, the complete system is expected to have one global memory order. This ordering expectation creates a problem in both the NUMA and COMA architectures employed by computer system 10, since the global order may need to be established by the order of operations upon network 14. If two nodes perform a transaction to an address, the order that the corresponding coherency operations occur at the home node for the address defines the order of the two transactions as seen within each node. For example, if two write transactions are performed to the same address, then the second write operation to arrive at the address' home node should be the second write transaction to complete (i.e. a byte location which is updated by both write transactions stores a value provided by the second write transaction upon completion of both transactions). However, the node which performs the second transaction may actually have the second transaction occur first upon SMP bus 20. Ignore signal 70 allows the second transaction to be transferred to system interface 24 without the remainder of the SMP node 12 reacting to the transaction.

Therefore, in order to operate effectively with the ordering constraints imposed by the out queue/in queue structure of address controller 52, system interface logic block 62 employs ignore signal 70. When a transaction is presented upon address bus 58 and system interface logic block 62 detects that a remote transaction is to be performed in response to the transaction, logic block 62 asserts the ignore signal 70. Assertion of the ignore signal 70 with respect to a transaction causes address controller 52 to inhibit storage of the transaction into in queues 74. Therefore, other transactions which may occur subsequent to the ignored transaction and which complete locally within SMP node 12A may complete out of order with respect to the ignored transaction without violating the ordering rules of in queue 74. In particular, transactions performed by system interface 24 in response to coherency activity upon network 14 may be performed and completed subsequent to the ignored transaction. When a response is received from the remote transaction, the ignored transaction may be reissued by system interface logic block 62 upon address bus 58. The transaction is thereby placed into in queue 74, and may complete in order with transactions occurring at the time of reissue.

It is noted that in one embodiment, once a transaction from a particular address controller 52 has been ignored, subsequent coherent transactions from that particular address controller 52 are also ignored. Transactions from a particular processor 16 may have an important ordering relationship with respect to each other, independent of the ordering requirements imposed by presentation upon address bus 58. For example, a transaction may be separated from another transaction by a memory synchronizing instruction such as the MEMBAR instruction included in the SPARC architecture. The processor 16 conveys the transactions in the order the transactions are to be performed with respect to each other. The transactions are ordered within out queue 72, and therefore the transactions originating from a particular out queue 72 are to be performed in order.

Ignoring subsequent transactions from a particular address controller 52 allows the in-order rules for a particular out queue 72 to be preserved. It is further noted that not all transactions from a particular processor must be ordered. However, it is difficult to determine upon address bus 58 which transactions must be ordered and which transactions may not be ordered. Therefore, in this implementation, logic block 62 maintains the order of all transactions from a particular out queue 72. It is noted that other implementations of subnode 50 are possible that allow exceptions to this rule.

Data controller 54 routes data to and from data bus 60, memory portion 56 and caches 18. Data controller 54 may include in and out queues similar to address controller 52. In one embodiment, data controller 54 employs multiple physical units in a byte-sliced bus configuration.

Processors 16 as shown in FIG. 2 include memory management units (MMUs) 76A–76B. MMUs 76 perform a virtual to physical address translation upon the data addresses generated by the instruction code executed upon processors 16, as well as the instruction addresses. The addresses generated in response to instruction execution are virtual addresses. In other words, the virtual addresses are the addresses created by the programmer of the instruction code. The virtual addresses are passed through an address translation mechanism (embodied in MMUs 76), from which corresponding physical addresses are created. The physical address identifies a storage location within memory 22.

Address translation is performed for many reasons. For example, the address translation mechanism may be used to grant or deny a particular computing task's access to certain memory addresses. In this manner, the data and instructions within one computing task are isolated from the data and instructions of another computing task. Additionally, portions of the data and instructions of a computing task may be "paged out" to a hard disk drive. When a portion is paged out, the translation is invalidated. Upon access to the portion by the computing task, an interrupt occurs due to the failed translation. The interrupt allows the operating system to retrieve the corresponding information from the hard disk drive. In this manner, more virtual memory may be available than actual memory in memory 22. Many other uses for virtual memory are well known.

Referring back to the computer system 10 shown in FIG. 1 in conjunction with the SMP node 12A implementation illustrated in FIG. 2, the physical address computed by MMUs 76 is a local physical address (LPA) defining a location within the memory 22 associated with the SMP node 12 in which the processor 16 is located. MTAG 68 stores a coherency state for each "coherency unit" in memory 22. When an address transaction is performed upon SMP bus 20, system interface logic block 62 examines the coherency state stored in MTAG 68 for the accessed coherency unit. If the coherency state indicates that the SMP node 12 has sufficient access rights to the coherency unit to perform the access, then the address transaction proceeds. If, however, the coherency state indicates that coherency activity should be performed prior to completion of the transaction, then system interface logic block 62 asserts the ignore signal 70. Logic block 62 performs coherency operations upon network 14 to acquire the appropriate coherency state. When the appropriate coherency state is acquired, logic block 62 reissues the ignored transaction upon SMP bus 20. Subsequently, the transaction completes.

Generally speaking, the coherency state maintained for a coherency unit at a particular storage location (e.g. a cache or a memory 22) indicates the access rights to the coherency unit at that SMP node 12. The access right indicates the validity of the coherency unit, as well as the read/write permission granted for the copy of the coherency unit within that SMP node 12. In one embodiment, the coherency states employed by computer system 10 are modified, owned, shared, and invalid. The modified state indicates that the SMP node 12 has updated the corresponding coherency unit. Therefore, other SMP nodes 12 do not have a copy of the coherency unit. Additionally, when the modified coherency unit is discarded by the SMP node 12, the coherency unit is stored back to the home node. The owned state indicates that the SMP node 12 is responsible for the coherency unit, but other SMP nodes 12 may have shared copies. Again, when the coherency unit is discarded by the SMP node 12, the coherency unit is stored back to the home node. The shared state indicates that the SMP node 12 may read the coherency unit but may not update the coherency unit without acquiring the owned state. Additionally, other SMP nodes 12 may have copies of the coherency unit as well. Finally, the invalid state indicates that the SMP node 12 does not have a copy of the coherency unit. In one embodiment, the modified state indicates write permission and any state but invalid indicates read permission to the corresponding coherency unit.

As used herein, a coherency unit is a number of contiguous bytes of memory which are treated as a unit for coherency purposes. For example, if one byte within the coherency unit is updated, the entire coherency unit is considered to be updated. In one specific embodiment, the coherency unit is a cache line, comprising 64 contiguous bytes. It is understood, however, that a coherency unit may comprise any number of bytes.

System interface 24 also includes a translation mechanism which utilizes translation storage 64 to store translations from the local physical address to a global address (GA). Certain bits within the global address identify the home node for the address, at which coherency information is stored for that global address. For example, an embodiment of computer system 10 may employ four SMP nodes 12 such as that of FIG. 1. In such an embodiment, two bits of the global address identify the home node. Preferably, bits from the most significant portion of the global address are used to identify the home node. The same bits are used in the local physical address to identify NUMA accesses. If the bits of the LPA indicate that the local node is not the home node, then the LPA is a global address and the transaction is performed in NUMA mode. Therefore, the operating system places global addresses in MMUs 76 for any NUMA-type pages. Conversely, the operating system places LPAs in MMU 76 for any COMA-type pages. It is noted that an LPA may equal a GA (for NUMA accesses as well as for global addresses whose home is within the memory 22 in the node in which the LPA is presented). Alternatively, an LPA may be translated to a GA when the LPA identifies storage locations used for storing copies of data having a home in another SMP node 12.

The directory 66 of a particular home node identifies which SMP nodes 12 have copies of data corresponding to a given global address assigned to the home node such that coherency between the copies may be maintained. Additionally, the directory 66 of the home node identifies the SMP node 12 which owns the coherency unit. Therefore, while local coherency between caches 18 and processors 16 is maintained via snooping, system-wide (or global) coherency is maintained using MTAG 68 and directory 66. Directory 66 stores the coherency information corresponding to the coherency units which are assigned to SMP node 12A (i.e. for which SMP node 12A is the home node).

It is noted that for the embodiment of FIG. 2, directory 66 and MTAG 68 store information for each coherency unit (i.e., on a coherency unit basis). Conversely, translation storage 64 stores local physical to global address translations defined for pages. A page includes multiple coherency units, and is typically several kilobytes or even megabytes in size.

Software accordingly creates local physical address to global address translations on a page basis (thereby allocating a local memory page for storing a copy of a remotely stored global page). Therefore, blocks of memory 22 are allocated to a particular global address on a page basis as well. However, as stated above, coherency states and coherency activities are performed upon a coherency unit. Therefore, when a page is allocated in memory to a particular global address, the data corresponding to the page is not necessarily transferred to the allocated memory. Instead, as processors 16 access various coherency units within the page, those coherency units are transferred from the owner of the coherency unit. In this manner, the data actually accessed by SMP node 12A is transferred into the corresponding memory 22. Data not accessed by SMP node 12A may not be transferred, thereby reducing overall bandwidth usage upon network 14 in comparison to embodiments which transfer the page of data upon allocation of the page in memory 22.

It is noted that in one embodiment, translation storage 64, directory 66, and/or MTAG 68 may be caches which store only a portion of the associated translation, directory, and MTAG information, respectively. The entirety of the translation, directory, and MTAG information is stored in tables within memory 22 or a dedicated memory storage (not shown). If required information for an access is not found in the corresponding cache, the tables are accessed by system interface 24.

Figure 2A:
FIG. 2A is an exemplary directory entry stored in one embodiment of a directory depicted in FIG. 2.

Turning now to FIG. 2A, an exemplary directory entry 71 is shown. Directory entry 71 may be employed by one embodiment of directory 66 shown in FIG. 2. Other embodiments of directory 66 may employ dissimilar directory entries. Directory entry 71 includes a valid bit 73, a write back bit 75, an owner field 77, and a sharers field 79. Directory entry 71 resides within the table of directory entries, and is located within the table via the global address identifying the corresponding coherency unit. More particularly, the directory entry 71 associated with a coherency unit is stored within the table of directory entries at an offset formed from the global address which identifies the coherency unit.

Valid bit 73 indicates, when set, that directory entry 71 is valid (i.e. that directory entry 71 is storing coherency information for a corresponding coherency unit). When clear, valid bit 73 indicates that directory entry 71 is invalid.

Owner field 77 identifies one of SMP nodes 12 as the owner of the coherency unit. The owning SMP node 12A–12D maintains the coherency unit in either the modified or owned states. Typically, the owning SMP node 12A–12D acquires the coherency unit in the modified state (see FIG. 13 below). Subsequently, the owning SMP node 12A–12D may then transition to the owned state upon providing a copy of the coherency unit to another SMP node 12A–12D. The other SMP node 12A–12D acquires the coherency unit in the shared state. In one embodiment, owner field 77 comprises two bits encoded to identify one of four SMP nodes 12A–12D as the owner of the coherency unit.

Sharers field 79 includes one bit assigned to each SMP node 12A–12D. If an SMP node 12A–12D is maintaining a shared copy of the coherency unit, the corresponding bit within sharers field 79 is set. Conversely, if the SMP node 12A–12D is not maintaining a shared copy of the coherency unit, the corresponding bit within sharers field 79 is clear. In this manner, sharers field 79 indicates all of the shared copies of the coherency unit which exist within the computer system 10 of FIG. 1.

Write back bit 75 indicates, when set, that the SMP node 12A–12D identified as the owner of the coherency unit via owner field 77 has written the updated copy of the coherency unit to the home SMP node 12. When clear, bit 75 indicates that the owning SMP node 12A–12D has not written the updated copy of the coherency unit to the home SMP node 12A–12D.

Figure 3:
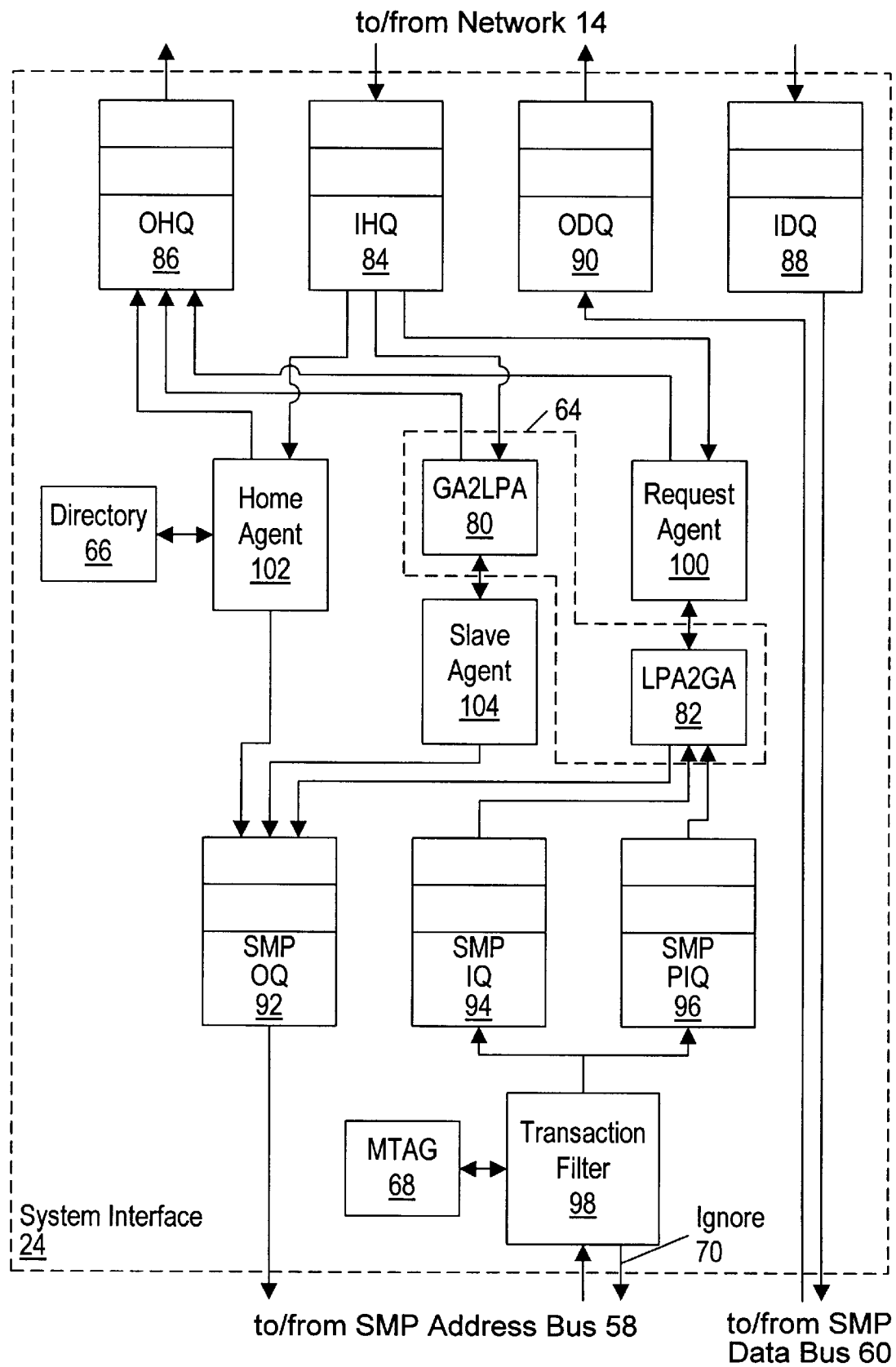
FIG. 3 is a block diagram of one embodiment of a system interface shown in FIG. 1.

Turning now to FIG. 3, a block diagram of one embodiment of system interface 24 is shown. As shown in FIG. 3, system interface 24 includes directory 66, translation storage 64, and MTAG 68. Translation storage 64 is shown as a global address to local physical address (GA2LPA) translation unit 80 and a local physical address to global address (LPA2GA) translation unit 82.

System interface 24 also includes input and output queues for storing transactions to be performed upon SMP bus 20 or network 14. Specifically, for the embodiment shown, system interface 24 includes input header queue 84 and output header queue 86 for buffering header packets to and from network 14. Header packets identify an operation to be performed, and specify the number and format of any data packets which may follow. Output header queue 86 buffers header packets to be transmitted upon network 14, and input header queue 84 buffers header packets received from network 14 until system interface 24 processes the received header packets. Similarly, data packets are buffered in input data queue 88 and output data queue 90 until the data may be transferred upon SMP data bus 60 and network 14, respectively.

SMP out queue 92, SMP in queue 94, and SMP I/O in queue (PIQ) 96 are used to buffer address transactions to and from address bus 58. SMP out queue 92 buffers transactions to be presented by system interface 24 upon address bus 58. Reissue transactions queued in response to the completion of coherency activity with respect to an ignored transaction are buffered in SMP out queue 92. Additionally, transactions generated in response to coherency activity received from network 14 are buffered in SMP out queue 92. SMP in queue 94 stores coherency related transactions to be serviced by system interface 24. Conversely, SMP PIQ 96 stores I/O transactions to be conveyed to an I/O interface residing in another SMP node 12. I/O transactions generally are considered non-coherent and therefore do not generate coherency activities.

SMP in queue 94 and SMP PIQ 96 receive transactions to be queued from a transaction filter 98. Transaction filter 98 is coupled to MTAG 68 and SMP address bus 58. If transaction filter 98 detects an I/O transaction upon address bus 58 which identifies an I/O interface upon another SMP node 12, transaction filter 98 places the transaction into SMP PIQ 96. If a coherent transaction to an LPA address is detected by transaction filter 98, then the corresponding coherency state from MTAG 68 is examined. In accordance with the coherency state, transaction filter 98 may assert ignore signal 70 and may queue a coherency transaction in SMP in queue 94. Ignore signal 70 is asserted and a coherency transaction queued if MTAG 68 indicates that insufficient access rights to the coherency unit for performing the coherent transaction is maintained by SMP node 12A. Conversely, ignore signal 70 is deasserted and a coherency transaction is not generated if MTAG 68 indicates that a sufficient access right is maintained by SMP node 12A.

Transactions from SMP in queue 94 and SMP PIQ 96 are processed by a request agent 100 within system interface 24. Prior to action by request agent 100, LPA2GA translation unit 82 translates the address of the transaction (if it is an LPA address) from the local physical address presented upon SMP address bus 58 into the corresponding global address. Request agent 100 then generates a header packet specifying a particular coherency request to be transmitted to the home node identified by the global address. The coherency request is placed into output header queue 86. Subsequently, a coherency reply is received into input header queue 84. Request agent 100 processes the coherency replies from input header queue 84, potentially generating reissue transactions for SMP out queue 92 (as described below).

Also included in system interface 24 is a home agent 102 and a slave agent 104. Home agent 102 processes coherency requests received from input header queue 84. From the coherency information stored in directory 66 with respect to a particular global address, home agent 102 determines if a coherency demand is to be transmitted to one or more slave agents in other SMP nodes 12. In one embodiment, home agent 102 blocks the coherency information corresponding to the affected coherency unit. In other words, subsequent requests involving the coherency unit are not performed until the coherency activity corresponding to the coherency request is completed. According to one embodiment, home agent 102 receives a coherency completion from the request agent which initiated the coherency request (via input header queue 84). The coherency completion indicates that the coherency activity has completed. Upon receipt of the coherency completion, home agent 102 removes the block upon the coherency information corresponding to the affected coherency unit. It is noted that, since the coherency information is blocked until completion of the coherency activity, home agent 102 may update the coherency information in accordance with the coherency activity performed immediately when the coherency request is received.

Slave agent 104 receives coherency demands from home agents of other SMP nodes 12 via input header queue 84. In response to a particular coherency demand, slave agent 104 may queue a coherency transaction in SMP out queue 92. In one embodiment, the coherency transaction may cause caches 18 and caches internal to processors 16 to invalidate the affected coherency unit. If the coherency unit is modified in the caches, the modified data is transferred to system interface 24. Alternatively, the coherency transaction may cause caches 18 and caches internal to processors 16 to change the coherency state of the coherency unit to shared. Once slave agent 104 has completed activity in response to a coherency demand, slave agent 104 transmits a coherency reply to the request agent which initiated the coherency request corresponding to the coherency demand. The coherency reply is queued in output header queue 86. Prior to performing activities in response to a coherency demand, the global address received with the coherency demand is translated to a local physical address via GA2LPA translation unit 80.

According to one embodiment, the coherency protocol enforced by request agents 100, home agents 102, and slave agents 104 includes a write invalidate policy. In other words, when a processor 16 within an SMP node 12 updates a coherency unit, any copies of the coherency unit stored within other SMP nodes 12 are invalidated. However, other write policies may be used in other embodiments. For example, a write update policy may be employed. According to a write update policy, when an coherency unit is updated the updated data is transmitted to each of the copies of the coherency unit stored in each of the SMP nodes 12.

Figure 4:
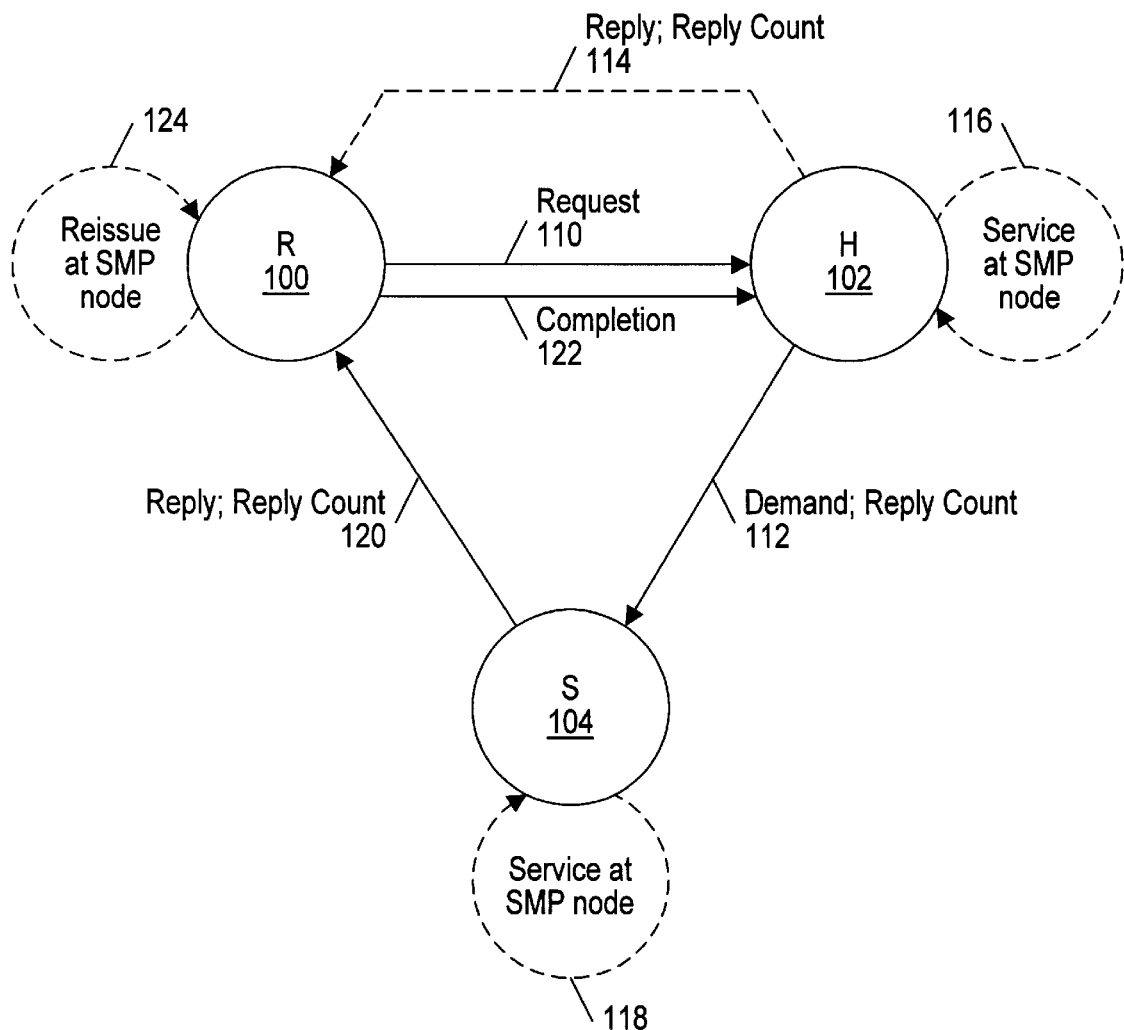
FIG. 4 is a diagram depicting activities performed in response to a typical coherency operation between a request agent, a home agent, and a slave agent.

Turning next to FIG. 4, a diagram depicting typical coherency activity performed between the request agent 100 of a first SMP node 12A–12D (the "requesting node"), the home agent 102 of a second SMP node 12A–12D (the "home node"), and the slave agent 104 of a third SMP node 12A–12D (the "slave node") in response to a particular transaction upon the SMP bus 20 within the SMP node 12 corresponding to request agent 100 is shown. Specific coherency activities employed according to one embodiment of computer system 10 as shown in FIG. 1 are further described below with respect to FIGS. 9–13. Reference numbers 100, 102, and 104 are used to identify request agents, home agents, and slave agents throughout the remainder of this description. It is understood that, when an agent communicates with another agent, the two agents often reside in different SMP nodes 12A–12D.

Upon receipt of a transaction from SMP bus 20, request agent 100 forms a coherency request appropriate for the transaction and transmits the coherency request to the home node corresponding to the address of the transaction (reference number 110). The coherency request indicates the access right requested by request agent 100, as well as the global address of the affected coherency unit. The access right requested is sufficient for allowing occurrence of the transaction being attempted in the SMP node 12 corresponding to request agent 100.

Upon receipt of the coherency request, home agent 102 accesses the associated directory 66 and determines which SMP nodes 12 are storing copies of the affected coherency unit. Additionally, home agent 102 determines the owner of the coherency unit. Home agent 102 may generate a coherency demand to the slave agents 104 of each of the nodes storing copies of the affected coherency unit, as well as to the slave agent 104 of the node which has the owned coherency state for the affected coherency unit (reference number 112). The coherency demands indicate the new coherency state for the affected coherency unit in the receiving SMP nodes 12, and may further include a "Reply Count" value indicative of the number of replies to be received. While the coherency request is outstanding, home agent 102 blocks the coherency information corresponding to the affected coherency unit such that subsequent coherency requests involving the affected coherency unit are not initiated by the home agent 102. Home agent 102 additionally updates the coherency information to reflect completion of the coherency request.

Home agent 102 may additionally transmit a coherency reply to request agent 100 (reference number 114). The coherency reply may also indicate the number of coherency replies which are forthcoming from slave agents 104. Alternatively, certain transactions may be completed without interaction with slave agents 104. For example, an I/O transaction targeting an I/O interface 26 in the SMP node 12 containing home agent 102 may be completed by home agent 102. Home agent 102 may queue a transaction for the associated SMP bus 20 (reference number 116), and then transmit a reply indicating that the transaction is complete.

A slave agent 104, in response to a coherency demand from home agent 102, may queue a transaction for presentation upon the associated SMP bus 20 (reference number 118). Additionally, slave agents 104 transmit a coherency reply to request agent 100 (reference number 120). The coherency reply indicates that the coherency demand received in response to a particular coherency request has been completed by that slave. The coherency reply may further include the Reply Count value. The coherency reply is transmitted by slave agents 104 when the coherency demand has been completed, or at such time prior to completion of the coherency demand at which the coherency demand is guaranteed to be completed upon the corresponding SMP node 12 and at which no state changes to the affected coherency unit will be performed prior to completion of the coherency demand.

When request agent 100 has received a coherency reply from each of the affected slave agents 104 (e.g., when the number of received replies equals the Reply Count value), request agent 100 transmits a coherency completion to home agent 102 (reference number 122). Upon receipt of the coherency completion, home agent 102 removes the block from the corresponding coherency information. Request agent 100 may queue a reissue transaction for performance upon SMP bus 20 to complete the transaction within the SMP node 12 (reference number 124).

It is noted that each coherency request is assigned a unique tag by the request agent 100 which issues the coherency request. Subsequent coherency demands, coherency replies, and coherency completions include the tag. In this manner, coherency activity regarding a particular coherency request may be identified by each of the involved agents. It is further noted that non-coherent operations may be performed in response to non-coherent transactions (e.g. I/O transactions). Non-coherent operations may involve only the requesting node and the home node. Still further, a different unique tag may be assigned to each coherency request by the home agent 102. The different tag identifies the home agent 102, and is used for the coherency completion in lieu of the requester tag.

Figure 5A:
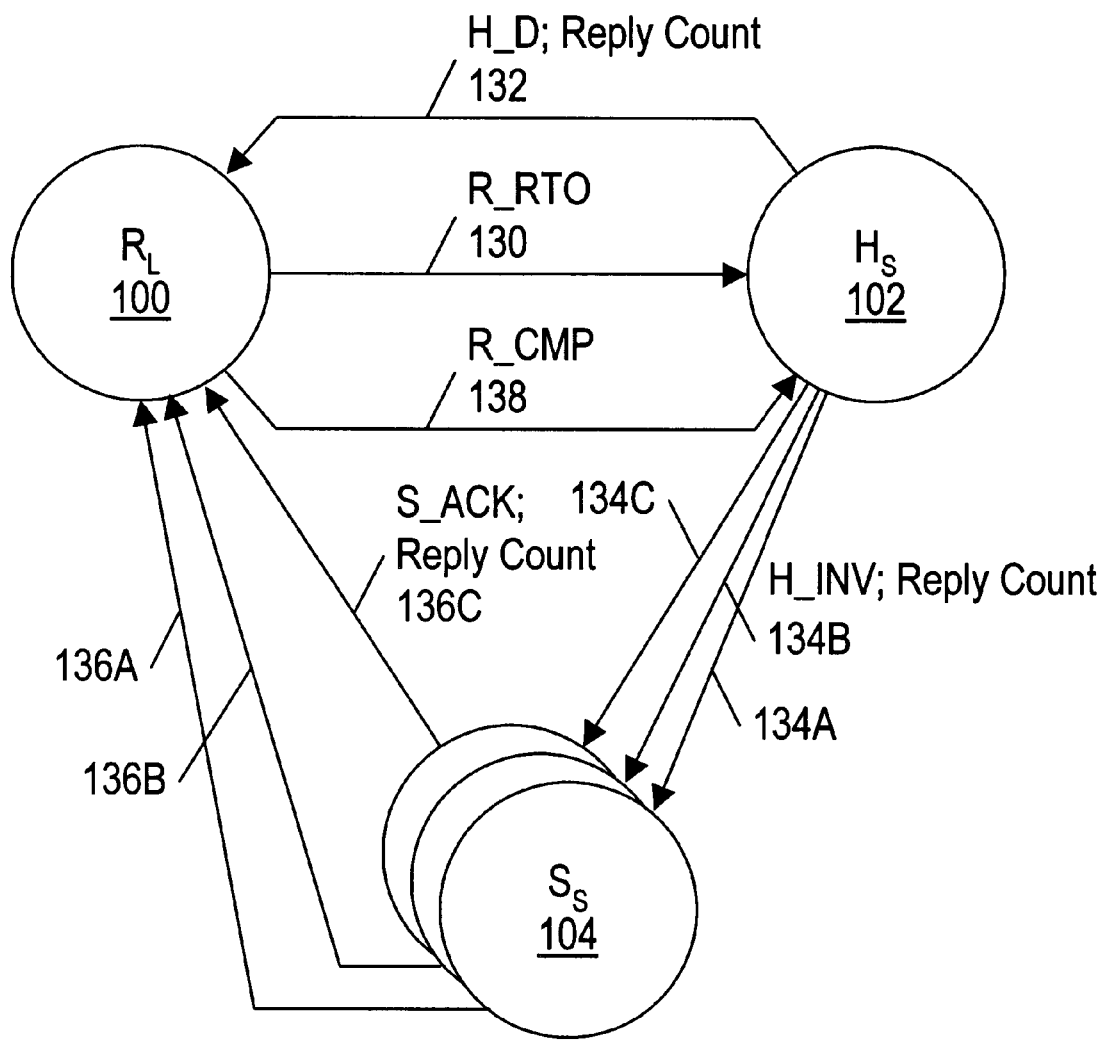
FIG. 5A is a diagram of an exemplary coherency operation performed in response to a read to own request from a processor.

Turning now to FIG. 5A, a diagram depicting coherency activity for an exemplary embodiment of computer system 10 in response to a read to own transaction upon SMP bus 20 is shown. A read to own transaction is performed when a cache miss is detected for a particular datum requested by a processor 16 and the processor 16 requests write permission to the coherency unit. A store cache miss may generate a read to own transaction, for example.

A request agent 100, home agent 102, and several slave agents 104 are shown in FIG. 5A. The node receiving the read to own transaction from SMP bus 20 stores the affected coherency unit in the invalid state (e.g. the coherency unit is not stored in the node). The subscript "i" in request node 100 indicates the invalid state. The home node stores the coherency unit in the shared state, and nodes corresponding to several slave agents 104 store the coherency unit in the shared state as well. The subscript "s" in home agent 102 and slave agents 104 is indicative of the shared state at those nodes. The read to own operation causes transfer of the requested coherency unit to the requesting node. The requesting node receives the coherency unit in the modified state.

Upon receipt of the read to own transaction from SMP bus 20, request agent 100 transmits a read to own coherency request to the home node of the coherency unit (reference number 130). The home agent 102 in the receiving home node detects the shared state for one or more other nodes. Since the slave ager are each in the shared state, not the owned state, the home node may supply the requested data directly. Home agent 102 transmits a data coherency reply to request agent 100, including the data corresponding to the requested coherency unit (reference number 132). Additionally, the data coherency reply the Reply Count value which indicates the total number of replies which are to be received prior to request agent 100 taking ownership of the data. Home agent 102 updates directory 66 to indicate that the requesting SMP node 12A–12D is the owner of the coherency unit, and that each of the other SMP nodes 12A–12D is invalid. When the coherency information regarding the coherency unit is unblocked upon receipt of a coherency completion from request agent 100, directory 66 matches the state of the coherency unit at each SMP node 12.

Home agent 102 transmits invalidate coherency demands to each of the slave agents 104 which are maintaining shared copies of the affected coherency unit (reference numbers 134A, 134B, and 134C). Each coherency demand may include the Reply Count value. The invalidate coherency demand causes the receiving slave agent to invalidate the corresponding coherency unit within the node, and to send an acknowledge coherency reply to the requesting node indicating completion of the invalidation. Each slave agent 104 completes invalidation of the coherency unit and subsequently transmits an acknowledge coherency reply (reference numbers 136A, 136B, and 136C). In one embodiment, each of the acknowledge replies includes the Reply Count value indicating the total number of replies to be received by request agent 100 with respect to the coherency unit.

Subsequent to receiving each of the acknowledge coherency replies from slave agents 104 and the data coherency reply from home agent 102, request agent 100 transmits a coherency completion to home agent 102 (reference number 138). Request agent 100 validates the coherency unit within its local memory, and home agent 102 releases the block upon the corresponding coherency information. It is noted that data coherency reply 132 and acknowledge coherency replies 136 may be received in any order depending upon the number of outstanding transactions within each node, among other things.

Figure 5B:
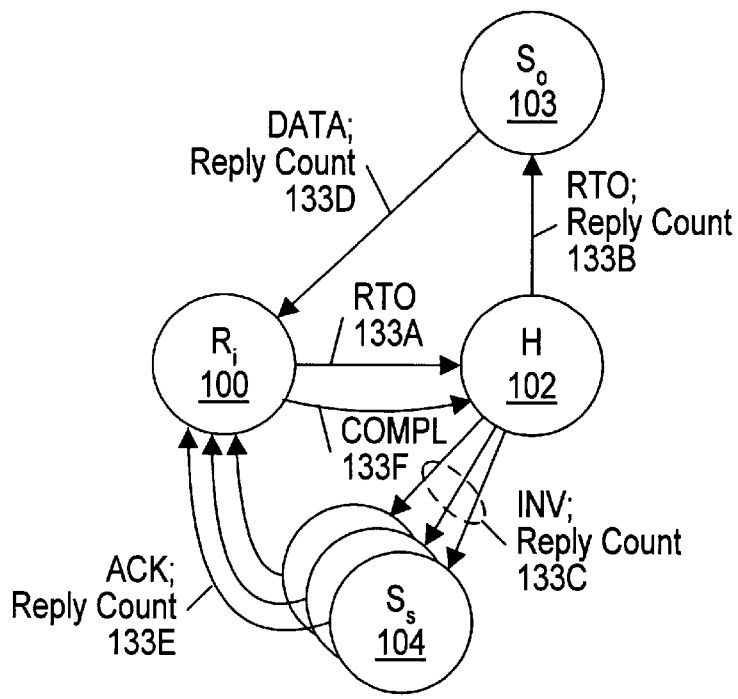
FIG. 5B is a diagram depicting coherency activity in response to a read to own request when a slave agent is the current owner of the coherency unit and other slave agents have shared copies of the coherency unit.

FIG. 5B is a diagram depicting coherency activity in response to a read-to-own transaction request when a slave agent 103 is the current owner of the coherency unit and other slave agents 104 have shared copies of the coherency unit. The request agent 100 initiates the transaction by sending a read-to-own request to home agent 102 (reference number 133A). This causes home agent 102 to block new transactions to this line. Home agent 102 marks the requester as the sole owner of the line and sends an RTO demand to the owning slave agent 103 (reference number 133B). Additionally, the read-to-own demand includes the Reply Count value which indicates the number of replies to be received. Home agent also sends invalidate coherency demands to all other slave agents 104 with a shared copy (reference number 133C). Each of these messages may also indicate the number of replies to be received.

The owning slave agent 103 replies with data to the requesting agent 100 (reference number 133) and invalidates its copy. This message similarly includes the Reply Count value. All sharing slave agents 104 send invalidation acknowledges to the requesting agent (reference number 133E) and invalidate their copies. The Reply Count value is sent with each of these messages as well. After receiving all acknowledges and the data, the request agent 100 sends a coherency completion back to the home agent 102 (reference number 133F). Home agent 102 responsively removes the block of this line.

Figure 5C:
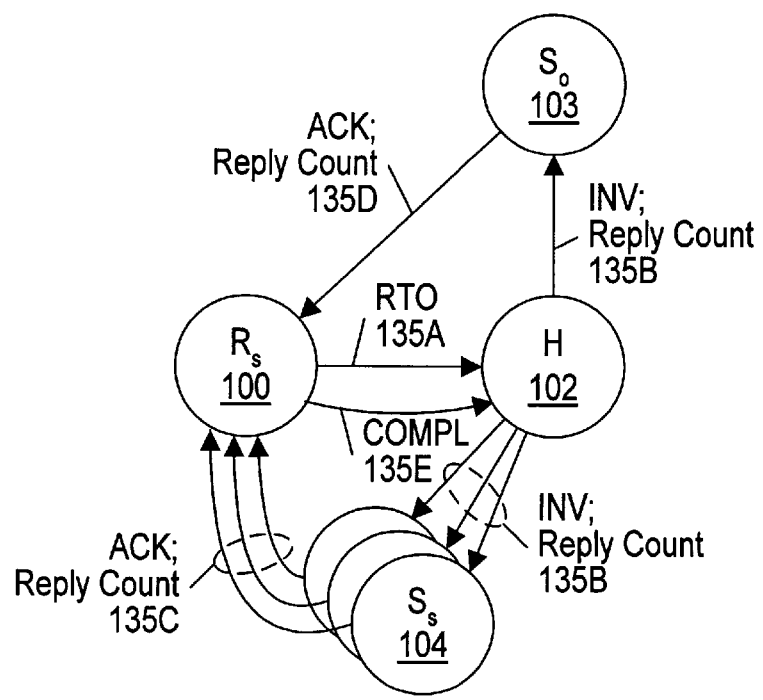
FIG. 5C is a diagram that depicts coherency activity when a request agent has a shared copy and sends a read to own request to a home agent.

FIG. 5C illustrates a transaction wherein request agent 100 has a shared copy and sends a read-to-own request to home agent 102 (reference number 135A). When home agent 102 receives the read-to-own request, home agent 102 blocks further transactions to this line. Home agent 102 further sends invalidation demands (reference number 135B) to all other nodes with a copy of the line (not to the requester, however). These demands include the Reply Count value. Home agent 102 further marks request agent 100 as the sole owner.

All slave agents (103 and 104) send invalidation acknowledges to request agent 100 (reference numbers 135C and 135D) and invalidate their copies. These messages further include the Reply Count value. Finally, request agent 100 sends a coherency completion back to the home agent 102 after receiving all acknowledges (reference number 135E). This causes home agent 102 to remove the block from the line.

Figure 5D:
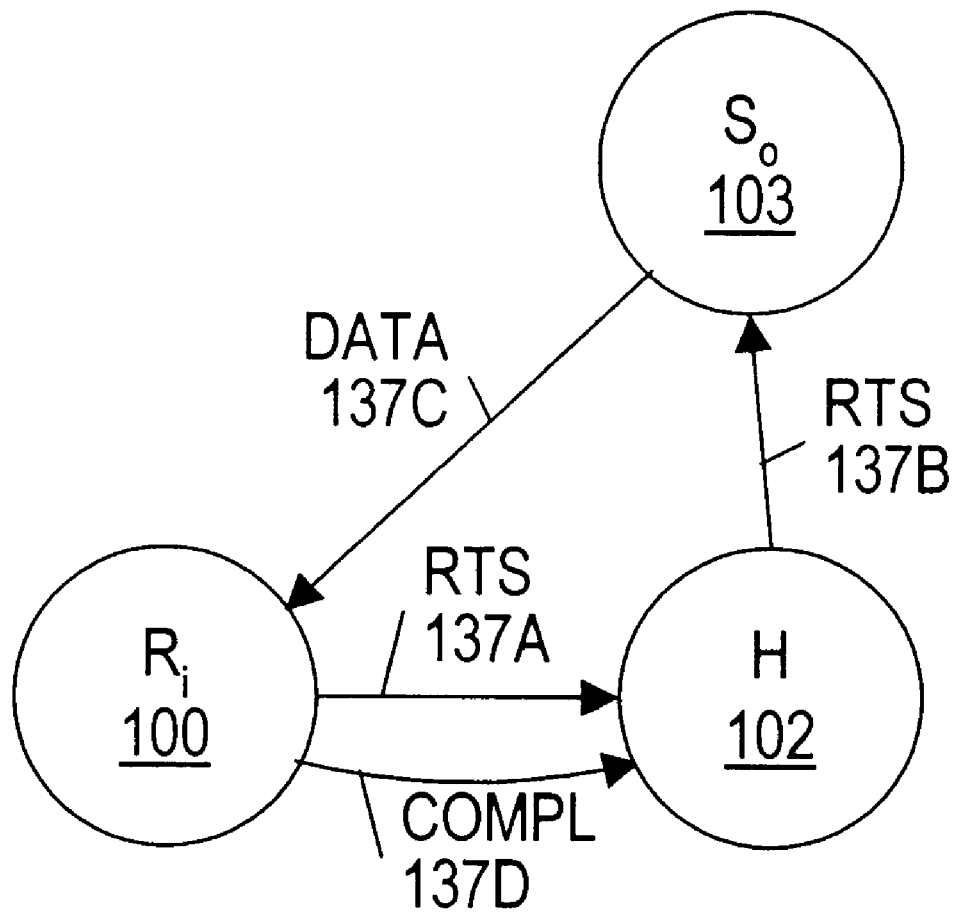
FIG. 5D is a diagram depicting coherency activity in response to a read to share request when a slave is the owner of a coherency unit.
Figure 5D:
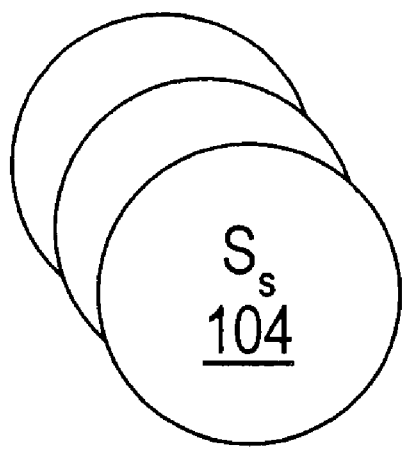

FIG. 5D depicts coherency activity in response to a read-to-share request when a slave is the owner of the coherency unit. Similar to the above description, the coherency activity initiates when the request agent 100 sends a read-to-share request to the home agent 102 (reference number 137A). This causes home agent 102 to block new transactions to this line. Home agent 102 marks the requester as a sharer and sends an RTS demand to the owner slave agent 103 (reference number 137B). The owning slave agent 103 replies with data to the request agent 100 (reference number 137C) and stays in the owned state. Finally, request agent 100 sends a coherency completion to the home agent (reference number 137D), which causes the block of this line to be removed.

It is noted that for read-to-share transaction requests, the reply count is one. For such transactions, the system may be implemented such that the Reply Count value is transmitted from the home agent to slaves and forwarded to the requesting agent in a manner similar to that described above for read-to-own transactions. Alternatively, the Reply Count value may not be conveyed for these transactions. Instead, the request agent may be configured to send the coherency completion immediately upon receiving a single reply.

It is further noted that implementations are possible wherein the reply count is transmitted via only one coherency demand and one corresponding coherency reply. In the above embodiment, since all demand and reply transactions include the reply count, the implementation may be simplified since it is unknown which reply will first arrive at the request agent. This allows for a symmetric design which also covers for cases wherein there is only a single data reply.

Figure 6:
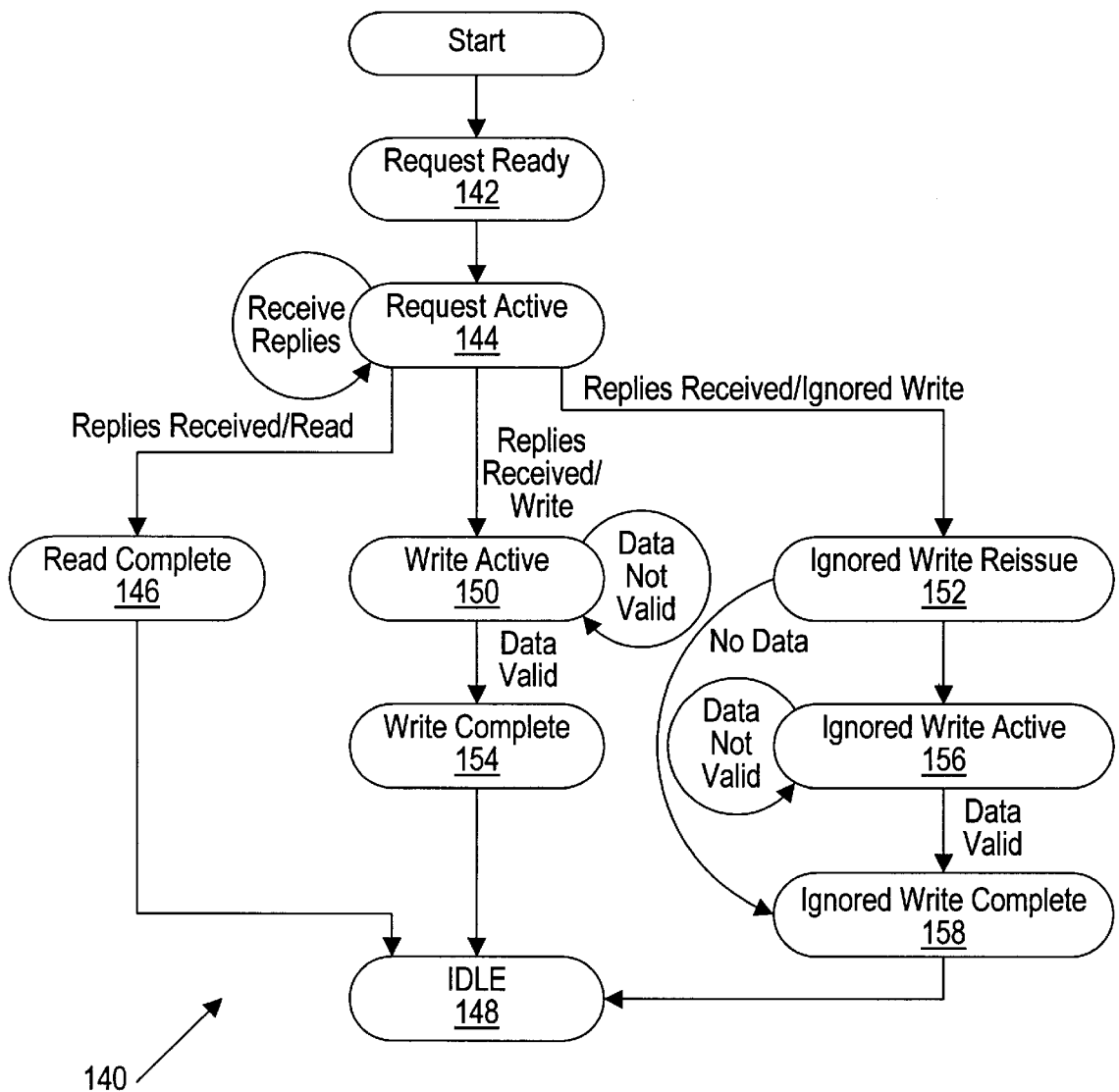
FIG. 6 is a flowchart depicting an exemplary state machine for one embodiment of a request agent shown in FIG. 3.

Turning now to FIG. 6, a flowchart 140 depicting an exemplary state machine for use by request agents 100 is shown. Request agents 100 may include multiple independent copies of the state machine represented by flowchart 140, such that multiple requests may be concurrently processed.

Upon receipt of a transaction from SMP in queue 94, request agent 100 enters a request ready state 142. In request ready state 142, request agent 100 transmits a coherency request to the home agent 102 residing in the home node identified by the global address of the affected coherency unit. Upon transmission of the coherency request, request agent 100 transitions to a request active state 144. During request active state 144, request agent 100 receives coherency replies from slave agents 104 (and optionally from home agent 102). When each of the coherency replies has been received, request agent 100 transitions to a new state depending upon the type of transaction which initiated the coherency activity. Additionally, request active state 142 may employ a timer for detecting that coherency replies have not be received within a predefined time-out period. If the timer expires prior to the receipt of the number of replies specified by home agent 102, then request agent 100 transitions to an error state (not shown). Still further, certain embodiments may employ a reply indicating that a read transfer failed. If such a reply is received, request agent 100 transitions to request ready state 142 to reattempt the read.

If replies are received without error or time-out, then the state transitioned to by request agent 100 for read transactions is read complete state 146. It is noted that, for read transactions, one of the received replies may include the data corresponding to the requested coherency unit. Request agent 100 reissues the read transaction upon SMP bus 20 and further transmits the coherency completion to home agent 102. Subsequently, request agent 100 transitions to an idle state 148. A new transaction may then be serviced by request agent 100 using the state machine depicted in FIG. 6.

Conversely, write active state 150 and ignored write reissue state 152 are used for write transactions. Ignore signal 70 is not asserted for certain write transactions in computer system 10, even when coherency activity is initiated upon network 14. For example, I/O write transactions are not ignored. The write data is transferred to system interface 24, and is stored therein. Write active state 150 is employed for non-ignored write transactions, to allow for transfer of data to system interface 24 if the coherency replies are received prior to the data phase of the write transaction upon SMP bus 20. Once the corresponding data has been received, request agent 100 transitions to write complete state 154. During write complete state 154, the coherency completion reply is transmitted to home agent 102. Subsequently, request agent 100 transitions to idle state 148.

Ignored write transactions are handled via a transition to ignored write reissue state 152. During ignored write reissue state 152, request agent 100 reissues the ignored write transaction upon SMP bus 20. In this manner, the write data may be transferred from the originating processor 16 and the corresponding write transaction released by processor 16. Depending upon whether or not the write data is to be transmitted with the coherency completion, request agent 100 transitions to either the ignored write active state 156 or the ignored write complete state 158. Ignored write active state 156, similar to write active state 150, is used to await data transfer from SMP bus 20. During ignored write complete state 158, the coherency completion is transmitted to home agent 102. Subsequently, request agent 100 transitions to idle state 148. From idle state 148, request agent 100 transitions to request ready state 142 upon receipt of a transaction from SMP in queue 94.

Figure 7:
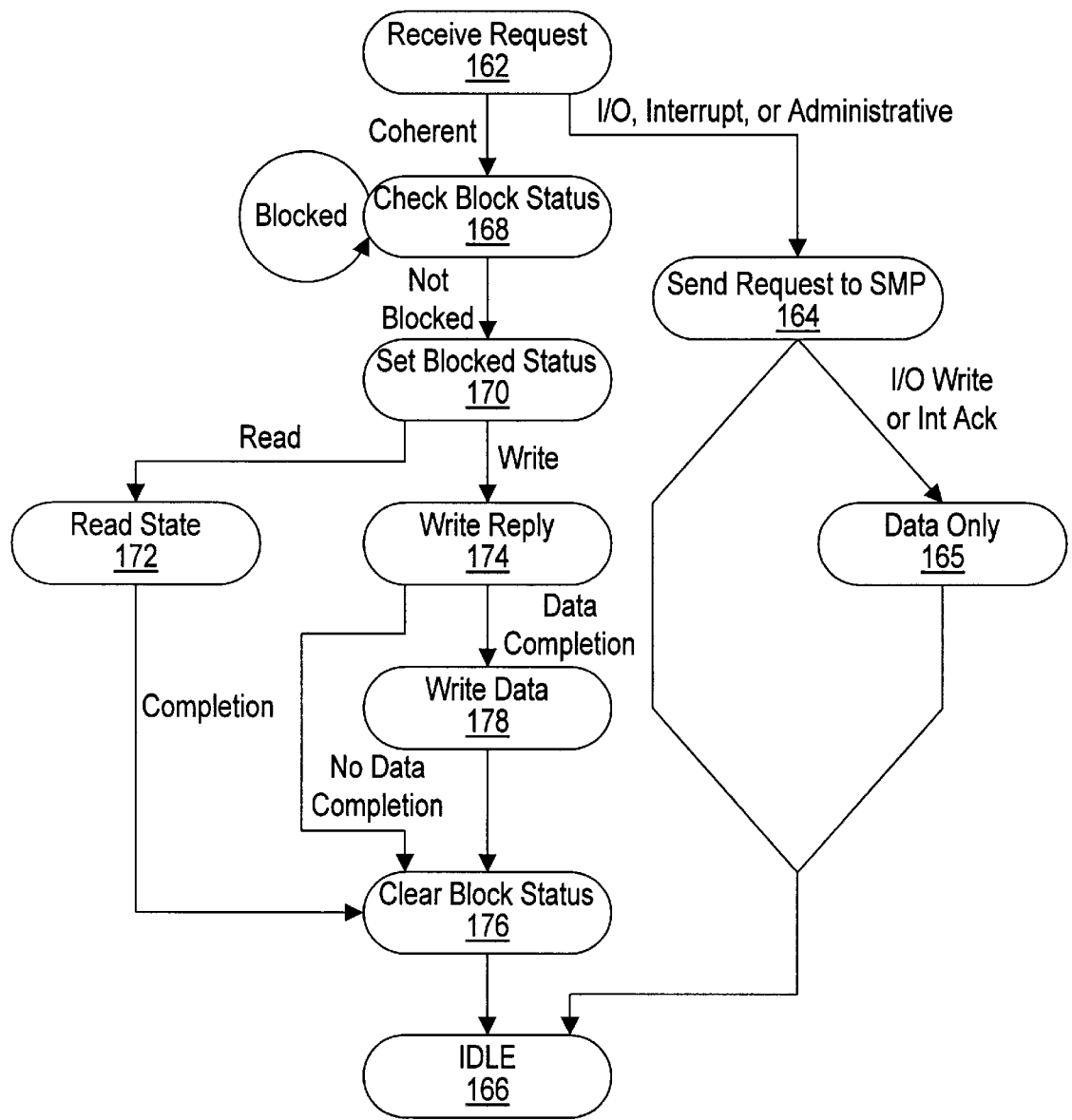
FIG. 7 is a flowchart depicting an exemplary state machine for one embodiment of a home agent shown in FIG. 3.

Turning next to FIG. 7, a flowchart 160 depicting an exemplary state machine for home agent 102 is shown. Home agents 102 may include multiple independent copies of the state machine represented by flowchart 160 in order to allow for processing of multiple outstanding requests to the home agent 102. However, the multiple outstanding requests do not affect the same coherency unit, according to one embodiment.

Home agent 102 receives coherency requests in a receive request state 162. The request may be classified as either a coherent request or an other transaction request. Other transaction requests may include I/O read and I/O write requests, interrupt requests, and administrative requests, according to one embodiment. The non-coherent requests are handled by transmitting a transaction upon SMP bus 20, during a state 164. A coherency completion is subsequently transmitted. Upon receiving the coherency completion, I/O write and accepted interrupt transactions result in transmission of a data transaction upon SMP bus 20 in the home node (i.e. data only state 165). When the data has been transferred, home agent 102 transitions to idle state 166. Alternatively, I/O read, administrative, and rejected interrupted transactions cause a transition to idle state 166 upon receipt of the coherency completion.

Conversely, home agent 102 transitions to a check state 168 upon receipt of a coherent request. Check state 168 is used to detect if coherency activity is in progress for the coherency unit affected by the coherency request. If the coherency activity is in progress (i.e. the coherency information is blocked), then home agent 102 remains in check state 168 until the in-progress coherency activity completes. Home agent 102 subsequently transitions to a set state 170.

During set state 170, home agent 102 sets the status of the directory entry storing the coherency information corresponding to the affected coherency unit to blocked. The blocked status prevents subsequent activity to the affected coherency unit from proceeding, simplifying the coherency protocol of computer system 10. Depending upon the read or write nature of the transaction corresponding to the received coherency request, home agent 102 transitions to read state 172 or write reply state 174.

While in read state 172, home agent 102 issues coherency demands to slave agents 104 which are to be updated with respect to the read transaction. Home agent 102 remains in read state 172 until a coherency completion is received from request agent 100, after which home agent 102 transitions to clear block status state 176. In embodiments in which a coherency request for a read may fail, home agent 102 restores the state of the affected directory entry to the state prior to the coherency request upon receipt of a coherency completion indicating failure of the read transaction.

During write state 174, home agent 102 transmits a coherency reply to request agent 100. Home agent 102 remains in write reply state 174 until a coherency completion is received from request agent 100. If data is received with the coherency completion, home agent 102 transitions to write data state 178. Alternatively, home agent 102 transitions to clear block status state 176 upon receipt of a coherency completion not containing data.

Home agent 102 issues a write transaction upon SMP bus 20 during write data state 178 in order to transfer the received write data. For example, a write stream operation (described below) results in a data transfer of data to home agent 102. Home agent 102 transmits the received data to memory 22 for storage. Subsequently, home agent 102 transitions to clear blocked status state 176.

Home agent 102 clears the blocked status of the coherency information corresponding to the coherency unit affected by the received coherency request in clear block status state 176. The coherency information may be subsequently accessed. The state found within the unblocked coherency information reflects the coherency activity initiated by the previously received coherency request. After clearing the block status of the corresponding coherency information, home agent 102 transitions to idle state 166. From idle state 166, home agent 102 transitions to receive request state 162 upon receipt of a coherency request.

Figure 8:
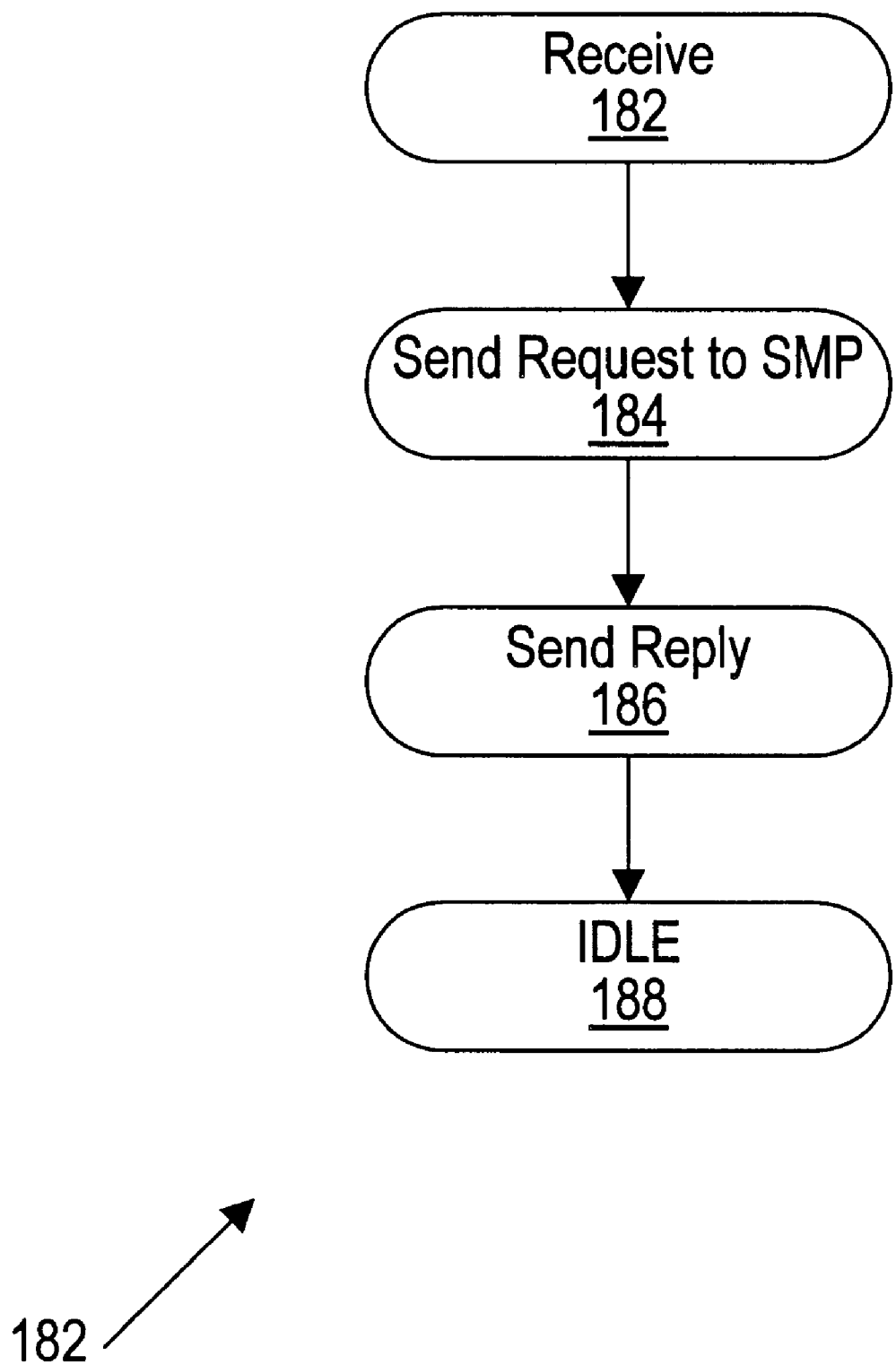
FIG. 8 is a flowchart depicting an exemplary state machine for one embodiment of a slave agent shown in FIG. 3.

Turning now to FIG. 8, a flowchart 180 is shown depicting an exemplary state machine for slave agents 104. Slave agent 104 receives coherency demands during a receive state 182. In response to a coherency demand, slave agent 104 may queue a transaction for presentation upon SMP bus 20. The transaction causes a state change in caches 18 and caches internal to processors 16 in accordance with the received coherency demand. Slave agent 104 queues the transaction during send request state 184.

During send reply state 186, slave agent 104 transmits a coherency reply to the request agent 100 which initiated the transaction. It is noted that, according to various embodiments, slave agent 104 may transition from send request state 184 to send reply state 186 upon queuing the transaction for SMP bus 20 or upon successful completion of the transaction upon SMP bus 20. Subsequent to coherency reply transmittal, slave agent 104 transitions to an idle state 188. From idle state 188, slave agent 104 may transition to receive state 182 upon receipt of a coherency demand.

Turning now to FIGS. 9–12, several tables are shown listing exemplary coherency request types, coherency demand types, coherency reply types, and coherency completion types. The types shown in the tables of FIGS. 9–12 may be employed by one embodiment of computer system 10. Other embodiments may employ other sets of types.

FIG. 9 is a table 190 listing the types of coherency requests. A first column 192 lists a code for each request type, which is used in FIG. 13 below. A second column 194 lists the coherency requests types, and a third column 196 indicates the originator of the coherency request. Similar columns are used in FIGS. 10–12 for coherency demands, coherency replies, and coherency completions. An "R" indicates request agent 100; an "S" indicates slave agent 104; and an "H" indicates home agent 102.

A read to share request is performed when a coherency unit is not present in a particular SMP node and the nature of the transaction from SMP bus 20 to the coherency unit indicates that read access to the coherency unit is desired. For example, a cacheable read transaction may result in a read to share request. Generally speaking, a read to share request is a request for a copy of the coherency unit in the shared state. Similarly, a read to own request is a request for a copy of the coherency unit in the owned state. Copies of the coherency unit in other SMP nodes should be changed to the invalid state. A read to own request may be performed in response to a cache miss of a cacheable write transaction, for example.

Read stream and write stream are requests to read or write an entire coherency unit. These operations are typically used for block copy operations. Processors 16 and caches 18 do not cache data provided in response to a read stream or write stream request. Instead, the coherency unit is provided as data to the processor 16 in the case of a read stream request, or the data is written to the memory 22 in the case of a write stream request. It is noted that read to share, read to own, and read stream requests may be performed as COMA operations (e.g. RTS, RTO, and RS) or as NUMA operations (e.g. RTSN, RTON, and RSN).

A write back request is performed when a coherency unit is to be written to the home node of the coherency unit. The home node replies with permission to write the coherency unit back. The coherency unit is then passed to the home node with the coherency completion.

The invalidate request is performed to cause copies of a coherency unit in other SMP nodes to be invalidated. An exemplary case in which the invalidate request is generated is a write stream transaction to a shared or owned coherency unit. The write stream transaction updates the coherency unit, and therefore copies of the coherency unit in other SMP nodes are invalidated.

I/O read and write requests are transmitted in response to I/O read and write transactions. I/O transactions are non-coherent (i.e. the transactions are not cached and coherency is not maintained for the transactions). I/O block transactions transfer a larger portion of data than normal I/O transactions. In one embodiment, sixty-four bytes of information are transferred in a block I/O operation while eight bytes are transferred in a non-block I/O transaction.

Flush requests cause copies of the coherency unit to be invalidated. Modified copies are returned to the home node. Interrupt requests are used to signal interrupts to a particular device in a remote SMP node. The interrupt may be presented to a particular processor 16, which may execute an interrupt service routine stored at a predefined address in response to the interrupt. Administrative packets are used to send certain types of reset signals between the nodes.

FIG. 10 is a table 198 listing exemplary coherency demand types. Similar to table 190, columns 192, 194, and 196 are included in table 198. A read to share demand is conveyed to the owner of a coherency unit, causing the owner to transmit data to the requesting node. Similarly, read to own and read stream demands cause the owner of the coherency unit to transmit data to the requesting node. Additionally, a read to own demand causes the owner to change the state of the coherency unit in the owner node to invalid. Read stream and read to share demands cause a state change to owned (from modified) in the owner node.

Invalidate demands do not cause the transfer of the corresponding coherency unit. Instead, an invalidate demand causes copies of the coherency unit to be invalidated. Finally, administrative demands are conveyed in response to administrative requests. It is noted that each of the demands are initiated by home agent 102, in response to a request from request agent 100.

Figure 11:
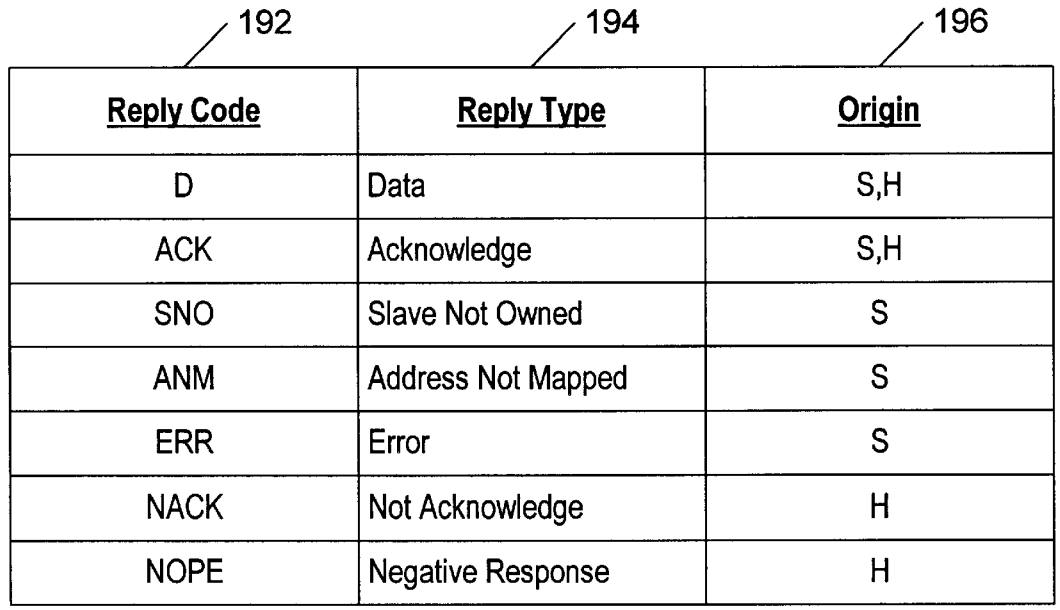
FIG. 11 is a table listing reply types according to one embodiment of the system interface.

FIG. 11 is a table 200 listing exemplary reply types employed by one embodiment of computer system 10. Similar to FIGS. 9 and 10, FIG. 11 includes columns 192, 194, and 196 for the coherency replies.

A data reply is a reply including the requested data. The owner slave agent typically provides the data reply for coherency requests. However, home agents may provide data for I/O read requests.

The acknowledge reply indicates that a coherency demand associated with a particular coherency request is completed. Slave agents typically provide acknowledge replies, but home agents provide acknowledge replies (along with data) when the home node is the owner of the coherency unit.

Slave not owned, address not mapped and error replies are conveyed by slave agent 104 when an error is detected. The slave not owned reply is sent if a slave is identified by home agent 102 as the owner of a coherency unit and the slave no longer owns the coherency unit. The address not mapped reply is sent if the slave receives a demand for which no device upon the corresponding SMP bus 20 claims ownership. Other error conditions detected by the slave agent are indicated via the error reply.

In addition to the error replies available to slave agent 104, home agent 102 may provide error replies. The negative acknowledge (NACK) and negative response (NOPE) are used by home agent 102 to indicate that the corresponding request is does not require service by home agent 102. The NACK transaction may be used to indicate that the corresponding request is rejected by the home node. For example, an interrupt request receives a NACK if the interrupt is rejected by the receiving node. An acknowledge (ACK) is conveyed if the interrupt is accepted by the receiving node. The NOPE transaction is used to indicate that a corresponding flush request was conveyed for a coherency unit which is not stored by the requesting node.

Figure 12:
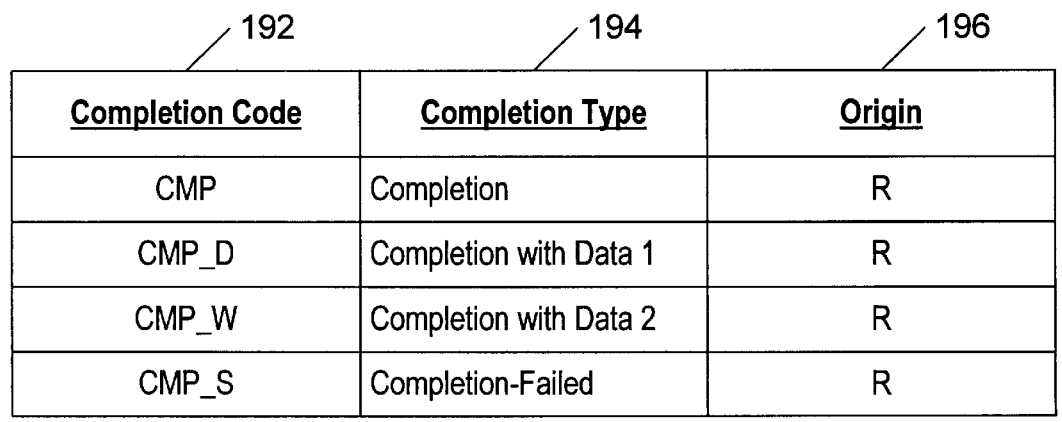
FIG. 12 is a table listing completion types according to one embodiment of the system interface.

FIG. 12 is a table 202 depicting exemplary coherency completion types according to one embodiment of computer system 10. Similar to FIGS. 9–11, FIG. 12 includes columns 192, 194, and 196 for coherency completions.

A completion without data is used as a signal from request agent 100 to home agent 102 that a particular request is complete. In response, home agent 102 unblocks the corresponding coherency information. Two types of data completions are included, corresponding to dissimilar transactions upon SMP bus 20. One type of reissue transaction involves only a data phase upon SMP bus 20. This reissue transaction may be used for I/O write and interrupt transactions, in one embodiment. The other type of reissue transaction involves both an address and data phase. Coherent writes, such as write stream and write back, may employ the reissue transaction including both address and data phases. Finally, a completion indicating failure is included for read requests which fail to acquire the requested state.

Turning next to FIG. 13, a table 210 is shown depicting coherency activity in response to various transactions upon SMP bus 20. Table 210 depicts transactions which result in requests being transmitted to other SMP nodes 12. Transactions which complete within an SMP node are not shown. A "-" in a column indicates that no activity is performed with respect to that column in the case considered within a particular row. A transaction column 212 is included indicating the transaction received upon SMP bus 20 by request agent 100. MTAG column 214 indicates the state of the MTAG for the coherency unit accessed by the address corresponding to the transaction. The states shown include the MOSI states described above, and an "n" state. The "n" state indicates that the coherency unit is accessed in NUMA mode for the SMP node in which the transaction is initiated. Therefore, no local copy of the coherency unit is stored in the requesting nodes memory. Instead, the coherency unit is transferred from the home SMP node (or an owner node) and is transmitted to the requesting processor 16 or cache 18 without storage in memory 22.

A request column 216 lists the coherency request transmitted to the home agent identified by the address of the transaction. Upon receipt of the coherency request listed in column 216, home agent 102 checks the state of the coherency unit for the requesting node as recorded in directory 66. D column 218 lists the current state of the coherency unit recorded for the requesting node, and D' column 220 lists the state of the coherency unit recorded for the requesting node as updated by home agent 102 in response to the received coherency request. Additionally, home agent 102 may generate a first coherency demand to the owner of the coherency unit and additional coherency demands to any nodes maintaining shared copies of the coherency unit. The coherency demand transmitted to the owner is shown in column 222, while the coherency demand transmitted to the sharing nodes is shown in column 224. Still further, home agent 102 may transmit a coherency reply to the requesting node. Home agent replies are shown in column 226.

The slave agent 104 in the SMP node indicated as the owner of the coherency unit transmits a coherency reply as shown in column 228. Slave agents 104 in nodes indicated as sharing nodes respond to the coherency demands shown in column 224 with the coherency replies shown in column 230, subsequent to performing state changes indicated by the received coherency demand.

Upon receipt of the appropriate number of coherency replies, request agent 100 transmits a coherency completion to home agent 102. The coherency completions used for various transactions are shown in column 232.

As an example, a row 234 depicts the coherency activity in response to a read to share transaction upon SMP bus 20 for which the corresponding MTAG state is invalid. The corresponding request agent 100 transmits a read to share coherency request to the home node identified by the global address associated with the read to share transaction. For the case shown in row 234, the directory of the home node indicates that the requesting node is storing the data in the invalid state. The state in the directory of the home node for the requesting node is updated to shared, and read to share coherency demand is transmitted by home agent 102 to the node indicated by the directory to be the owner. No demands are transmitted to sharers, since the transaction seeks to acquire the shared state. The slave agent 104 in the owner node transmits the data corresponding to the coherency unit to the requesting node. Upon receipt of the data, the request agent 100 within the requesting node transmits a coherency completion to the home agent 102 within the home node. The transaction is therefore complete.

It is noted that the state shown in D column 218 may not match the state in MTAG column 214. For example, a row 236 shows a coherency unit in the invalid state in MTAG column 214. However, the corresponding state in D column 218 may be modified, owned, or shared. Such situations occur when a prior coherency request from the requesting node for the coherency unit is outstanding within computer system 10 when the access to MTAG 68 for the current transaction to the coherency unit is performed upon address bus 58. However, due to the blocking of directory entries during a particular access, the outstanding request is completed prior to access of directory 66 by the current request. For this reason, the generated coherency demands are dependent upon the directory state (which matches the MTAG state at the time the directory is accessed). For the example shown in row 236, since the directory indicates that the coherency unit now resides in the requesting node, the read to share request may be completed by simply reissuing the read transaction upon SMP bus 20 in the requesting node. Therefore, the home node acknowledges the request, including a reply count of one, and the requesting node may subsequently reissue the read transaction. It is further noted that, although table 210 lists many types of transactions, additional transactions may be employed according to various embodiments of computer system 10.

Although SMP nodes 12 have been described in the above exemplary embodiments, generally speaking an embodiment of computer system 10 may include one or more processing nodes. As used herein, a processing node includes at least one processor and a corresponding memory. Additionally, circuitry for communicating with other processing nodes is included. When more than one processing node is included in an embodiment of computer system 10, the corresponding memories within the processing nodes form a distributed shared memory. A processing node may be referred to as remote or local. A processing node is a remote processing node with respect to a particular processor if the processing node does not include the particular processor. Conversely, the processing node which includes the particular processor is that particular processor's local processing node.

Numerous variations and modifications will become apparent to those skilled in the art once the above disclosure is fully appreciated. It is intended that the following claims be interpreted to embrace all such variations and modifications.

What is claimed is:

1. A multiprocessing computer system including a plurality of processing nodes interconnected by a network, said multiprocessing computer system comprising:
    a request agent configured to generate a coherency request;
    a home agent coupled to receive said coherency request through said network and to generate a coherency demand in response to said coherency request; and
    a slave agent coupled to receive said coherency demand through said network and to generate a coherency reply in response to said coherency demand;
    wherein said request agent is configured to receive said coherency reply through said network from said slave agent and to generate a coherency completion in response to said coherency reply;
    wherein said home agent is coupled to receive said coherency completion;
    wherein said home agent is configured to generate a separate coherency demand for each node of said multiprocessing computer system which has a copy of a coherency unit corresponding to said coherency request; and
    wherein each said separate coherency demand includes a reply count indicative of a total number of replies to be received by said request agent.

2. The multiprocessing computer system as recited in claim 1 wherein said home agent includes a directory indicative of particular nodes of said multiprocessing computer system that contain copies of a given coherency unit.

3. The multiprocessing computer system as recited in claim 2 wherein said given coherency unit is specified by said coherency request.

4. The multiprocessing computer system as recited in claim 1 wherein each said separate coherency demand indicates a new coherency state for said coherency unit.

5. The multiprocessing computer system as recited in claim 1 wherein said request agent is configured to convey said coherency completion to said home agent after a coherency reply has been received by said request agent from each node having a copy of said coherency unit.

6. The multiprocessing computer system as recited in claim 1 wherein said request agent is configured to assign a unique tag to said coherency request.

7. The multiprocessing computer system as recited in claim 1 wherein said home agent is configured to block subsequent requests to a coherency unit corresponding to said coherency request in response to receiving said coherency request.

8. The multiprocessing computer system as recited in claim 7 wherein said home agent is configured to remove said block of subsequent requests to said coherency unit in response to a receipt of said coherency completion.

9. The multiprocessing computer system as recited in claim 1 wherein said coherency request is a read-to-own request.

10. The multiprocessing computer system as recited in claim 1 wherein said coherency request is a read-to-share request.

11. A method for maintaining coherency in a multiprocessing computer system including a plurality of processing nodes interconnected by a network, said method comprising:
    a request agent generating a coherency request;
    a home agent receiving said coherency request through said network;
    said home agent generating a coherency demand in response to said coherency request;
    a slave agent receiving said coherency demand through said network;
    said slave agent generating a coherency reply in response to said coherency demand;
    said request agent receiving said coherency reply through said network from said slave agent;
    said request agent generating a coherency completion in response to said coherency reply;
    said home agent receiving said coherency completion;
    wherein said home agent generates a separate coherency demand for each node of said multiprocessing computer system which has a copy of a coherency unit corresponding to said coherency request;
    wherein each said separate coherency demand includes a reply count indicative of a total number of replies to be received by said request agent.

12. The method for maintaining coherency as recited in claim 11 wherein each of said separate coherency demands indicates a new coherency state for said coherency unit.

13. The method for maintaining coherency as recited in claim 11 wherein said coherency request is a read-to-own request.

14. The method for maintaining coherency as recited in claim 11 wherein said coherency request is a read-to-share request.

15. A multiprocessing computer system including a plurality of processing nodes interconnected by a network, said multiprocessing computer system comprising:
    a request agent configured to generate a coherency request;
    a home agent coupled to receive said coherency request through said network; and
    a slave agent coupled to said network;
    wherein, if a valid copy of said slave agent contains a copy of a coherency unit corresponding to said coherency request, said home agent conveys a coherency demand in response to said coherency request to said slave agent, and wherein said slave agent conveys a coherency reply to said request agent in response to said coherency demand, and wherein said request agent conveys a coherency completion to said home agent in response to said coherency reply; and
    wherein, if said coherency unit resides solely within a local node corresponding to said home agent, said home agent conveys a coherency reply to said request agent in response to said coherency demand, and wherein said request agent conveys a coherency completion to said home agent in response to said coherency reply;

wherein said home agent is configured to generate separate coherency demands for each node of said multi-processing computer system which has a copy of said coherency unit corresponding to said coherency request;

wherein each of said separate coherency demands includes a reply count indicative of a total number of replies to be received by said request agent.

16. The multiprocessing computer system as recited in claim 15 wherein said home agent includes a directory indicative of particular nodes of said multiprocessing computer system that contain copies of a given coherency unit.

17. The multiprocessing computer system as recited in claim 16 wherein said given coherency unit is specified by said coherency request.

18. The multiprocessing computer system as recited in claim 15 wherein each of said separate coherency demands indicates a new coherency state for said coherency unit.

19. The multiprocessing computer system as recited in claim 15 wherein said request agent is configured to convey said coherency completion to said home agent after a coherency reply has been received by said request agent from each node having a copy of said coherency unit.

20. The multiprocessing computer system as recited in claim 15 wherein said request agent is configured to assign a unique tag to said coherency request.

21. The multiprocessing computer system as recited in claim 14 wherein said home agent is configured to block subsequent requests to said coherency unit corresponding to said coherency request in response to receiving said coherency request.

22. The multiprocessing computer system as recited in claim 21 wherein said home agent is configured to remove said block of subsequent requests to said coherency unit in response to a receipt of said coherency completion.

23. The multiprocessing computer system as recited in claim 15 wherein said coherency request is a read-to-own request.

24. The multiprocessing computer system as recited in claim 17 wherein said coherency request is a read-to-share request.

* * * * *